United States Patent
Catton et al.

(10) Patent No.: US 8,967,236 B2
(45) Date of Patent: Mar. 3, 2015

(54) INORGANIC AQUEOUS SOLUTION (IAS) FOR PHASE-CHANGE HEAT TRANSFER MEDIUM

(71) Applicant: The Regents of the University of California, Oakland, CA (US)

(72) Inventors: Ivan Catton, Los Angeles, CA (US); Huishu Thomas Tao, Walnut, CA (US); Sean W. Reilly, Los Angeles, CA (US); Ladan Amouzegar, Los Angeles, CA (US); Qi Yao, Los Angeles, CA (US); Michael J. Stubblebine, Los Angeles, CA (US); Jacob Supowit, Valencia, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/844,296

(22) Filed: Mar. 15, 2013

(65) Prior Publication Data

US 2014/0090817 A1    Apr. 3, 2014

Related U.S. Application Data

(60) Provisional application No. 61/646,155, filed on May 11, 2012.

(51) Int. Cl.
    *C09K 5/04*      (2006.01)
    *F28D 15/04*      (2006.01)

(52) U.S. Cl.
    CPC . *C09K 5/048* (2013.01); *C09K 5/04* (2013.01); *F28D 15/04* (2013.01)

USPC .......... 165/104.26; 165/104.21; 252/71; 252/74

(58) Field of Classification Search
None
See application file for complete search history.

(56) References Cited

U.S. PATENT DOCUMENTS

| | | | | |
|---|---|---|---|---|
| 2,764,553 | A * | 9/1956 | Hartford | 252/74 |
| 3,400,249 | A * | 9/1968 | Mekjean et al. | 392/341 |
| 5,529,709 | A * | 6/1996 | Rockenfeller | 252/69 |
| 5,718,836 | A * | 2/1998 | Nakatani et al. | 252/74 |
| 6,183,547 | B1 | 2/2001 | Miller et al. | |
| 6,203,718 | B1 | 3/2001 | Erickson | |
| 6,784,356 | B1 | 8/2004 | Czarnecki et al. | |
| 6,811,720 | B2 * | 11/2004 | Qu | 252/70 |
| 6,989,107 | B1 * | 1/2006 | Skold | 252/71 |
| 7,258,814 | B2 * | 8/2007 | Egawa et al. | 252/76 |
| 8,235,096 | B1 * | 8/2012 | Mahefkey et al. | 165/104.26 |

(Continued)

OTHER PUBLICATIONS

International Search Report and the Written Opinion of the International Searching Authority, or the Declaration, for International application No. PCT/US2013/032703, dated Jun. 26, 2013, 10 pages.

*Primary Examiner* — Wayne Langel
(74) *Attorney, Agent, or Firm* — Christie, Parker & Hale, LLP

(57) ABSTRACT

An inorganic aqueous solution for use in a phase-change heat transfer device comprises an aqueous solution of potassium permanganate ($KMnO_4$), potassium dichromate ($K_2Cr_2O_7$), chromium trioxide ($CrO_3$), silver chromate ($Ag_2CrO_4$), strontium hydroxide ($Sr(OH)_2$), calcium hydroxide ($Ca(OH)_2$), magnesium hydroxide ($Mg(OH)_2$) and sodium hydroxide (NaOH).

27 Claims, 28 Drawing Sheets
(26 of 28 Drawing Sheet(s) Filed in Color)

(56) References Cited

U.S. PATENT DOCUMENTS

| | | | |
|---|---|---|---|
| 8,434,225 B2 * | 5/2013 | Mahefkey et al. | 29/890.032 |
| 2004/0069454 A1 * | 4/2004 | Bonsignore et al. | 165/104.15 |
| 2005/0056807 A1 * | 3/2005 | Qu | 252/70 |
| 2009/0032227 A1 * | 2/2009 | Krassowski et al. | 165/104.26 |
| 2009/0166014 A1 | 7/2009 | Chang et al. | |
| 2009/0294102 A1 | 12/2009 | Yang et al. | |

* cited by examiner

INORGANIC AQUEOUS SOLUTION (IAS) FOR PHASE-CHANGE HEAT TRANSFER MEDIUM

CROSS-REFERENCE TO RELATED APPLICATION(S)

This application claims priority to and the benefit of U.S. Provisional Application Ser. No. 61/646,155, titled INORGANIC AQUEOUS SOLUTION (IAS) FOR PHASE CHANGE HEAT TRANSFER MEDIUM, and filed on May 11, 2012, the entire content of which is incorporated herein by reference.

STATEMENT REGARDING FEDERALLY SPONSORED RESEARCH OR DEVELOPMENT

This invention was made with Government support under Grant Nos. N66001-08-C-2007 and W31P4Q-09-1-0005 awarded by the United States Department of Defense, Defense Advanced Research Projects Agency. The Government has certain rights in the invention.

TECHNICAL FIELD

The disclosure relates generally to heat transfer media and to devices and methods for transferring heat. More particularly, the disclosure relates to a working fluid for use as a phase-change heat transfer medium, to heat transfer devices including the working fluid, and to methods for making the heat transfer devices including the working fluid.

BACKGROUND

A heat pipe is a heat-transfer device that uses thermal conductivity and phase transition principles to effect the transfer of heat between two solid interfaces, e.g., a heat source (or hot interface) and a heat sink (or cold interface). Heat pipes are used in many applications to effect cooling. For example, heat pipes are one of the most effective means of electronics cooling on the market. They transfer energy primarily by latent heat which allows them to operate with minimal temperature drop between the heat source and the heat sink. Furthermore, they are passive devices, needing no input to operate or machinery to function.

A typical heat pipe includes a sealed casing made of a thermally conductive material (such as copper, aluminum or stainless steel) that is filled with a working fluid at a given pressure. One end of the heat pipe is at the heat source, and the other end is at the heat sink. To transfer heat between the heat source and the heat sink, the working fluid contacts the thermally conductive material of the casing at the heat source end (or hot interface), which when heated turns the working fluid into vapor. The vapor then travels to the heat sink end (or cold interface) where the vapor condenses back into a liquid and releases latent heat. Upon condensing back into the liquid phase, the working fluid travels back to the heat source end of the heat pipe, and the working fluid evaporates again, repeating the evaporation and condensation cycle.

Once the vapor created from the heat source condenses back to a liquid at the heat sink end of the heat pipe, the liquid must travel back to the heat source end to begin the cycle anew. To facilitate travel of the condensed liquid back to the heat source end of the heat pipe, gravity may be sufficient in certain circumstances. However, in some applications, the heat pipe may be oriented in a manner that does not allow gravity to facilitate movement of the liquid back to the heat source end of the heat pipe. For example, in certain applications, the heat pipe may be positioned such that the heat source end and the heat sink end are positioned horizontally rather than vertically. In these configurations, a wick may be used to facilitate movement of the liquid back to the heat source end by capillary action.

The working fluid conducts heat by a combination of sensible and latent heat. Desirable characteristics of the working fluid include high specific heat capacity, high surface tension, low contact angle, and low viscosity. High specific heat capacity enables large amounts of energy to be added to the liquid with little change in temperature, thereby minimizing the difference in temperature between the heater (or heat source) and condenser (or heat sink) required for operation. High surface tension helps provide ample capillary pressure to pump the liquid to the evaporating surface. A low contact angle provides a thin film evaporation region that is as large as possible, which allows for more heat transfer. Low viscosity reduces the amount of flow resistance required to move the liquid to the heat source to be evaporated.

Some typical working fluids include water, alcohols (such as methanol or ethanol), refrigerants (such as R134 (i.e., freon)), ammonia, and mixtures of water and alcohols. Selection of the material for the working fluid depends on the desired operating temperature and heat load. For example, for applications operating at extremely low temperatures, the working fluid might include liquid helium (2-4K), and for applications operating at extremely high temperatures, the working fluid might include mercury (523-923K), sodium (873-1473K), or indium (2000-3000K). For applications operating at low temperatures, some typical working fluids might include water (303-473K) or alcohols (e.g., methanol (283-403K) or ethanol (273-403K)). However, most heat pipes are offered between 233 and 473K, and use ammonia, alcohol, ethanol, water, or mixtures thereof.

Ammonia and alcohols do not have heat transfer effectiveness (i.e., small temperature differences to transfer large amounts of heat at moderate pressures) over a broad range of operating temperatures (e.g., about −25° C. to about 200° C.). Water can partly accomplish such heat transfer effectiveness over a broad range of operating temperatures, but can only be used in copper heat pipes. In particular, water has high specific heat capacity and a large enthalpy of vaporization, and may be used in many applications requiring a broad range of operating temperatures (i.e., about −25° C. to about 200° C.). Heat pipes that operate within this range are especially useful in electronic devices, regenerators in electrical power plants, aircraft carrier decks, and satellites. Accordingly, water is a particularly desirable working fluid for use in many applications. Indeed, water is frequently used in copper heat pipes. However, water cannot be used as the working fluid in aluminum heat pipes because a runaway chemical reaction takes place that forms non-condensable gasses (such as hydrogen gas), causing the heat pipe to fail. In particular, the formation of non-condensable gasses (NCGs) prevents energy from being rejected at the condenser.

Aluminum is light weight and low in cost, and has relatively high thermal conductivity (i.e., half that of copper). Aluminum is also approximately one third as dense as copper, and considerably cheaper than copper. As such, heat pipes made of aluminum are particularly desirable, and development of an aluminum heat pipe using water as the working fluid has been the subject of recent research. This research has generally focused on providing a coating on the inner surface of the aluminum pipe, which coating was intended to prevent the formation of NCGs. Some such attempts at devising an aluminum heat pipe using water as a working fluid included providing a coating having anti-corrosion properties on the internal surface of the aluminum pipe. However, these coatings are not replenished in the sealed heat pipe. As such, if the coating is compromised or damaged, NCGs will form, leading to rapid failure of the heat pipe.

In another attempt to reduce or prevent NCG formation in an aluminum heat pipe, an aqueous solution including specific inorganic salts is used as the working fluid. This solution creates a coating on the inner surface of the casing to protect the aluminum from corrosion and thereby prevent or reduce NCG formation. The continued presence of the inorganic salts in the working fluid allows the coating to self-heal if it is damaged or compromised. However, while this solution exhibits acceptable heat transfer properties and stable operation in aluminum heat transfer devices, the formulation includes toxic components (such as beryllium), and radioactive components (such as lawrencium). Other drawbacks to this solution include the propensity for particulate and sediment formation, and clogging of the wick. Moreover, heat pipes using this solution were manufactured in China under secret conditions by a single producer, and these heat pipes are believed to be no longer in production.

SUMMARY

According to embodiments of the present invention, an inorganic aqueous solution for use in a phase-change heat transfer device includes potassium permanganate ($KMnO_4$), potassium dichromate ($K_2Cr_2O_7$), chromium trioxide ($CrO_3$), silver chromate ($Ag_2CrO_4$), strontium hydroxide ($Sr(OH)_2$), calcium hydroxide ($Ca(OH)_2$), magnesium hydroxide ($Mg(OH)_2$), sodium hydroxide (NaOH), and water. The inorganic aqueous solution may also include boric acid ($H_3BO_3$) and/or an alcohol, such as methanol. The inorganic aqueous solution may have an initial pH of about 5 to about 7.

In some embodiments, the inorganic aqueous solution is used as the working fluid in a heat transfer device. The heat transfer device may include an elongated member having a cavity and being made of a conductive material. The inorganic aqueous solution is charged in the cavity of the elongated member. The conductive material of the elongated member may be aluminum, an aluminum alloy, copper, a copper alloy, stainless steel, or a combination thereof. In some embodiments, for example, the conductive material is aluminum or an aluminum alloy.

The heat transfer device may also include a wick lining the cavity of the elongated member. The wick may be made of a material selected from aluminum, aluminum alloys, copper, copper alloys, stainless steel, and combinations thereof. For example, in some embodiments, the wick may be made of copper or a copper alloy. In some embodiments, the wick may be a bi-porous wick.

The heat transfer device may further include a passivation layer lining the cavity. The passivation layer is formed from a reaction between the inorganic aqueous solution and the conductive material. In embodiments including a wick lining the cavity of the elongated member, the passivation layer may be on the wick. In these embodiments, the passivation layer is formed from the reaction of the inorganic aqueous solution with the material of the wick.

According to another embodiment of the present invention, a method of preparing an inorganic aqueous solution for use in a phase-change heat transfer device includes dissolving potassium permanganate in water to form a solution. Then, the method includes dissolving potassium dichromate in the solution. The method further includes adding chromium trioxide to the solution, and then adding silver chromate, strontium hydroxide, calcium hydroxide, and magnesium hydroxide to the solution. Additionally, the method includes adding sodium hydroxide to the solution. The method further includes diluting the solution to the desired volume and concentration, for example using water and/or an alcohol (such as methanol). The method may further include filtering the solution to remove insoluble particulates, if needed.

The method may further include adjusting the pH of the solution, which can be accomplished by adding boric acid, additional sodium hydroxide and/or additional chromium trioxide. Adjusting the pH of the solution may include adjusting the pH to about 5 to about 7, for example, about 6.22.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of the present invention will be better understood by reference to the following detailed description when considered in conjunction with the accompanying drawings, in which.

DETAILED DESCRIPTION

Figure 1:
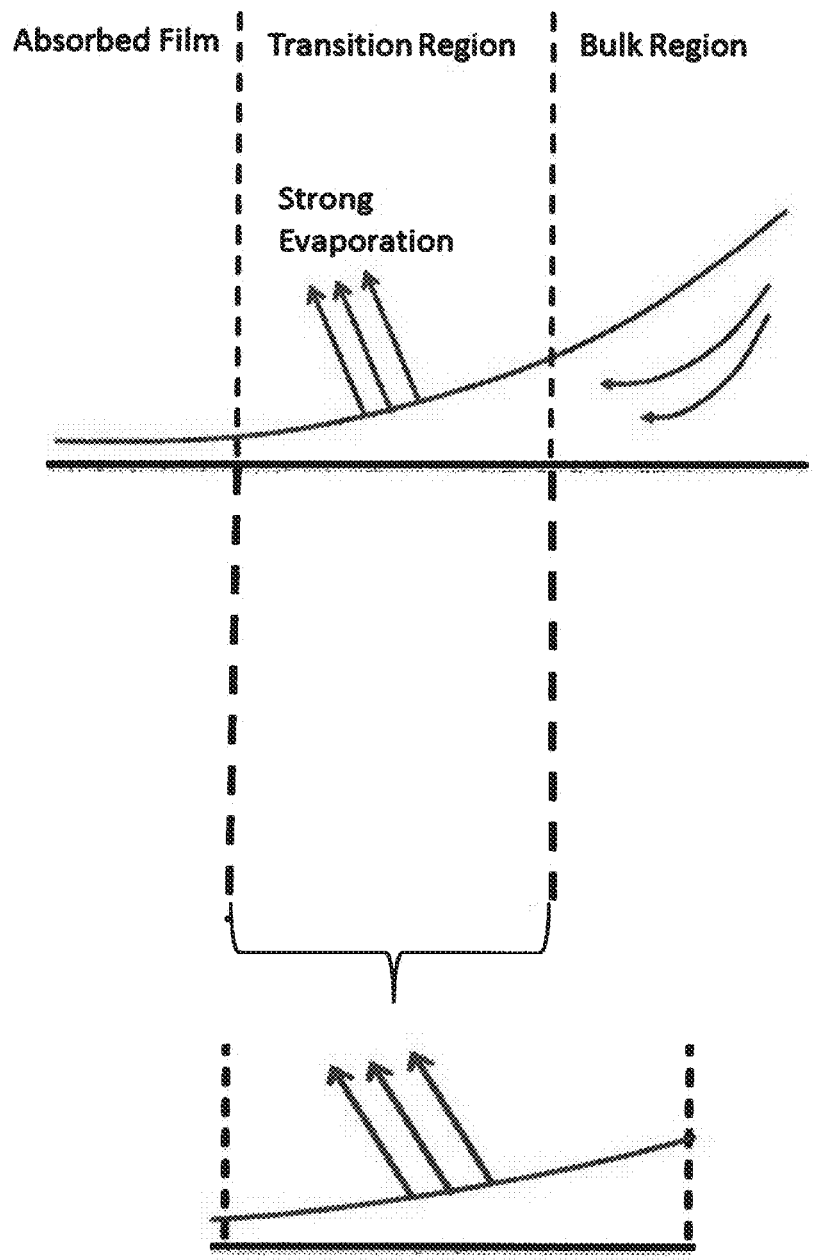
FIG. 1 shows a theoretical interline modification caused by using an inorganic aqueous solution ("IAS") in a heat transfer device.

According to embodiments of the present invention, a thermal transfer fluid includes a multi-electrolyte, inorganic aqueous solution (also referred to herein as "IAS"). The inorganic aqueous solution ("IAS") is suitable for use as the working fluid in a closed heat transfer system in which energy is transferred between an evaporator (also referred to herein as "heat source" or "hot interface") and a condenser (also referred to herein as "heat sink" or "cold interface") via phase changes of the IAS. In particular, the heat transfer system transfers energy from the evaporator to the condenser by heating the IAS to turn it into vapor. The vapor then travels to the condenser where it condenses back into a liquid and releases latent heat. The condensed liquid then travels back to the evaporator where the cycle begins anew. Although the IAS is useful in any such heat transfer system, the IAS is particularly useful in aluminum heat pipes (i.e., heat pipes including a casing made of aluminum or an aluminum alloy) since the IAS forms a passivation coating on the inner surface of the aluminum heat pipe which substantially prevents reaction of the water in the IAS with the aluminum (or aluminum alloy) surface, thereby substantially preventing the formation of non-condensable gasses (such as hydrogen gas) over the life of the IAS. As used herein, the term "substantially" is used as a term of approximation and not a term of degree, and is intended to account for the inherent deviations in measured or calculated values that would be recognized by those of ordinary skill in the art. Accordingly, as used herein, "substantially prevents reaction of the water in the IAS with the aluminum (or aluminum alloy) surface" and similar terms mean that any reaction of the water in the IAS with the aluminum or aluminum alloy surface of the heat pipe is negligible. Similarly, as used herein, "substantially prevents the formation of non-condensable gasses" and similar terms mean that any formation of non-condensable gasses is negligible.

In some embodiments of the present invention, the IAS includes a number of inorganic compounds in water. Each of the components of the IAS contributes different characteristics and properties to the final IAS. In some embodiments, the IAS includes a strong oxidizer, a coating ion, a passivation component, at least one electron balancing component, and water. The passivation component may include silver, gold or platinum ions, however, for economic reasons, in some embodiments, the metal ion is a silver ion.

The electron balancing component can be any ions or combination of ions capable of adjusting or controlling the pH of the solution. Indeed, the electron balancing component may be any suitable positive and/or negative ions, for example, hydroxide ions, hydrogen ions, potassium ions, sodium ions, and combinations or mixtures thereof. Indeed, all the components of the IAS, not just the electron balancing component, are a combination of positive and negative ions, and many of the positive ions used in salt forms that provide the ions of the electron balancing component are the same as the positive ions in other components of the IAS. In some embodiments, for example, the electron balancing component includes ions that can be provided by a number of hydroxide salt forms that disassociate into their respective positive and negative ions in water, thereby supplying the ions of the electron balancing component. Some suitable such salt forms include sodium hydroxide (which disassociates into $Na^+$ and $OH^-$), magnesium hydroxide (which disassociates into $Mg^{2+}$ and $OH^-$), calcium hydroxide (which disassociates into $Ca^{2+}$ and $OH^-$), strontium hydroxide (which disassociates into $Sr^{2+}$ and $OH^-$). Any one or combination of these salt forms may be used as a source for the electron balancing ions (e.g., $H^+$, $Na^+$, $K^+$ and $OH^-$) in the IAS, as well as a source for other components of the IAS. For example, potassium permanganate disassociates into $K^+$ and $MnO_4^-$, which makes it a suitable source for both the strong oxidizer component (i.e., the $MnO_4^-$ ion) and the electron balancing component (i.e., the $K^+$ ion) of the IAS. As another example, sodium hydroxide disassociates into $Na^+$ and $OH^-$, both of which can be used as electron balancing ions. Also, calcium hydroxide disassociates into $Ca^{2+}$, which can be used as a coating ion, and $OH^-$, which can be used as an electron balancing component.

In addition, any of the positive ions in the salt forms used as the source for the electron balancing component can be used as the coating ion in the IAS. For example, the salt forms discussed above as useful as a source for the electron balancing component can also be used as a source for the coating ion. In particular, the coating ion may include, for example, magnesium ions, calcium ions, strontium ions, and/or sodium ions.

As used herein, the term "strong oxidizer" means an oxidizer that is significantly stronger than a hydrogen ion. The strong oxidizer serves to bypass or negate the production of hydrogen gas, which is normally generated when water reacts with an aluminum surface. However, when the IAS according to embodiments of the present invention is used in an aluminum device, the strong oxidizer reacts with the aluminum surface faster than the water reacts with the aluminum. As such, the reaction of the strong oxidizer in the IAS with the aluminum occurs before the reaction of the water with the aluminum, thereby preventing the formation of NCGs (e.g., hydrogen gas). Suitable strong oxidizers include peroxides, fluorine, cobalt (III) compounds, permanganates and chromates. In some embodiments, the strong oxidizer is a permanganate or a chromate.

In some embodiments, for example, the strong oxidizer is a permanganate ion or a chromate ion. The source of the permanganate ion and/or chromate ion may be any suitable salt form, and the counter ion (or positive ion) in such salt forms can be any suitable counter ion. Some nonlimiting examples of suitable counter ions for the permanganate ion source and chromate ion source include potassium ions, calcium ions, sodium ions, magnesium ions, strontium ions, hydrogen ions and silver ions. In some embodiments, for example, the permanganate source is potassium permanganate, and the chromate source is silver chromate, silver dichromate, potassium dichromate or chromium trioxide.

In some embodiments of the present invention, the IAS including the strong oxidizer, coating ion, passivation component, electron balancing component and water, includes a number of positive and negative ions in water. For example, in some embodiments, the IAS includes strong oxidizing ions (such as permanganate ions or chromate ions), passivation ions (such as silver, gold or platinum ions), coating ions (such as calcium, magnesium, strontium and sodium) and electron balancing ions (such as hydroxide ions) in water. Upon charging such a solution in a heat transfer device, the strong oxidizing ions react with the surface of the device to create a passivation layer that protects the surface from reaction with the water in the IAS.

In some exemplary embodiments, the IAS includes water, potassium ions and permanganate ions (from a potassium permanganate ($KMnO_4$) salt form), potassium ions and dichromate ions (from a potassium dichromate ($K_2Cr_2O_7$) salt form), chromium trioxide ($CrO_3$) (which forms chromic acid ($H_2CrO_4$) when exposed to water), silver ions and chromate ions (from a silver chromate ($Ag_2CrO_4$) salt form) or silver ions and dichromate ions (from a silver dichromate ($Ag_2Cr_2O_7$) salt form), strontium ions and hydroxide ions (from a strontium hydroxide ($Sr(OH)_2$)), calcium ions and hydroxide ions (from a calcium hydroxide ($Ca(OH)_2$) salt form), magnesium ions and hydroxide ions (from a magnesium hydroxide ($Mg(OH)_2$) salt form), and sodium ions and hydroxide ions (from a sodium hydroxide (NaOH) salt form). In some embodiments, the IAS may further include boric acid ($H_3BO_3$ which ionizes to $H_3O^+$, $H_2BO_3^-$, $HBO_3^{2-}$ and $BO_3^{3-}$ in water) to adjust the pH of the solution. Also, in some embodiments, the IAS may further include an alcohol (e.g., methanol). The alcohol may be added to the IAS when the solution is intended for use in low temperature applications.

Upon suspending or dissolving the salt compounds discussed above in water to form the IAS, the salt compounds disassociate into their respective positive and negative ions. As such, although the IAS is described throughout this disclosure as including certain salt forms in water, (e.g., potassium permanganate), upon adding those salts to water, the resulting IAS actually includes the ions resulting from the disassociation of the salts. For example, an IAS including potassium permanganate, silver chromate and water, actually includes water, potassium ions, permanganate ions, silver ions, and chromate ions. For ease of description, this disclosure refers to the IAS as including the salt forms in water. However, it is understood that this manner of describing the IAS encompasses solutions including the disassociated salt forms, i.e., solutions of water and the positive and negative ions resulting from the disassociation of the salt forms.

The constituents of the IAS may be used in any suitable amount, i.e., any amount suitable to create a passivation layer on the surface of the material of the heat transfer device. Indeed, the amounts or concentrations of each of the constituents will depend on the material, structure, volume, total surface area, and evaporating area of the heat transfer device in which the IAS is used. However, in some embodiments, for example, the IAS may include about 65 wt % to about 75 wt % potassium dichromate, about 10 wt % to about 20 wt % chromium trioxide, about 0.01 wt % to about 0.1 wt % silver chromate or silver dichromate, about 0.5 wt % to about 1.5 wt % strontium hydroxide, about 4 wt % to about 12 wt % calcium hydroxide, about 0.1 wt % to about 0.5 wt % magnesium hydroxide, about 1 wt % to about 5 wt % sodium hydroxide, and about 1 wt % to about 5 wt % potassium permanganate, based on a total weight of the solids content of the IAS (i.e., the total weight of the inorganic compounds excluding the weight of the water and any alcohol present). In one embodiment, for example, the IAS may include about 69 wt % to about 70 wt % potassium dichromate, about 15 wt % to about 16 wt % chromium trioxide, about 0.04 wt % to about 0.06 wt % silver chromate, about 0.8 wt % to about 0.9 wt % strontium hydroxide, about 7 wt % to about 9 wt % calcium hydroxide, about 0.2 wt % to about 0.3 wt % magnesium hydroxide, about 2 wt % to about 3 wt % sodium hydroxide, and about 3 wt % to about 4 wt % potassium permanganate, based on a total weight of the solids content of the IAS (i.e., the total weight of the inorganic compounds excluding the weight to the water and any alcohol present). Stated somewhat differently, in a 1 L solution, the IAS may include about 2 g to about 10 g potassium dichromate, about 0.1 g to about 5 g chromium trioxide, about 0.002 g to about 0.01 g silver chromate, about 0.01 g to about 0.3 g strontium hydroxide, about 0.1 g to about 2.0 g calcium hydroxide, about 0.005 g to about 0.1 g magnesium hydroxide, about 0.05 g to about 0.5 g sodium hydroxide, and about 0.005 g to about 1.0 g potassium permanganate. Additionally, in some embodiments, in the final IAS, the chemicals (i.e., the constituents other than water and/or alcohol) make up about 5% by weight or less of the total solution. In addition to the amounts listed here, additional sodium hydroxide and/or chromium trioxide may be added in order to adjust the pH of the solution, as necessary. Also or alternatively, boric acid may be added in any amount suitable to adjust the pH of the solution to the desired value. The amount of additional sodium hydroxide and/or chromium trioxide and/or boric acid needed to achieve the desired pH is determinable by those of ordinary skill in the art.

The amount of water and/or alcohol present in the IAS will depend on the desired concentration of the solution. As noted above, the concentration of the solution depends on the material, structure, volume, total surface area, and evaporating area of the heat transfer device, e.g., the available effective area, and the type of heat transfer device. For example, in cases where the heat transfer device is wicked by a porous material, the concentration of the solutes in the IAS should be present in a sufficiently high amount to provide a layer of coverage over the available surface of the particles to enhance the wetting properties, but not so high as to clog the pores of the wick. Determining the proper concentration of the IAS to meet certain needs or specifications (e.g., to be compatible with the material of the heat transfer device, or to be compatible with and substantially avoid clogging of the wick material (when used) is within the skill of those of ordinary skill in the art.

The pH of the solution dictates the amount and type of deposits in the passivation coating formed on the surface of the heat transfer device. As such, the desired pH may be different for different materials and/or structures of the heat transfer device. In general, however, the passivation coating (e.g., the amount and type of deposits in the layer) can be tuned by manipulating the pH of the IAS. As described above, the pH of the IAS can be adjusted using boric acid, additional sodium hydroxide and/or additional chromium trioxide. The amount of any of these chemicals needed to achieve the desired pH would be readily discernible by those of ordinary skill in the art, through, for example, standard titration procedures.

Also, the pH of the IAS prior to being charged in the heat transfer device, and prior to operation of the heat transfer device will generally be different than the final pH achieved upon operation of the heat transfer device. This is because the final pH of the solution is a function of temperature. As such, during or after operation of the device, the temperature in the device will cause the pH of the solution to change. Generally, the higher temperature of the heat transfer device turns the solution more basic, i.e., increases the pH of the solution. As the pH of the solution will generally increase once it is charged in the heat transfer device and the device is operated, the pH of the solution prior to charging in the device may be lower than the final desired pH. In some embodiments, for example, the initial pH of the IAS (i.e., the pH of the solution prior to being charged in the heat transfer device) may be generally neutral or even slightly acidic. For example, in some embodiments, the initial pH of the device may be about 5 to about 7, for example about 6 to about 7, or about 6 to about 6.5. In one exemplary embodiment, the initial pH of the solution may be about 6.22.

The final pH number (i.e., the pH of the IAS during operation of the heat transfer device) is a function of temperature. Theoretically, if the IAS is exposed to an excessive amount of copper, the final pH number can reach a maximum value of 12. However, due to the passivating effect of the IAS fluid, the final pH number will not reach its potential maximum. The final pH number depends on many factors, including total effective internal surface area, charge amount, and solution concentration. In general, a higher final pH number can be achieved using higher temperatures.

An initial heating of a heat transfer device charged with the IAS according to embodiments of the present invention may lead to improved performance of the heat transfer device. In some embodiments, for example, heating the heat transfer device to a higher temperature will yield a higher final pH number before the passivation process is completed. This may also benefit the heat transfer performance. In some embodiments, the initial heating is performed at a temperature of about 100° C. or higher, for example a temperature of about 100° C. to about 400° C.

In some embodiments, the heat transfer device may be charged with the IAS at room temperature, a temperature at which the reactions between the chemicals and the surface are slow. Chemical equilibrium will be reached during an initial heat up or during the first use of the device.

It should be noted that the passivation processes for aluminum and copper are different. For aluminum, permanganate, a strong oxidizer, reacts with the aluminum surface and generates a thin compact layer of aluminum oxide, which protects the surface. Correspondingly, the color of the IAS becomes yellow when exposed to aluminum substrates, but discoloration occurs faster with copper substrates. For copper, permanganate completely reacts with the surface. The passivation effect is due to the presence of chromate, which reacts with copper to generate chromium(III) oxide and protects the copper surface.

According to embodiments of the present invention, the IAS is a suspension having particles larger than about 100 nm. The suspended particles include manganese (IV) oxide and magnesium chromate.

The IAS solution may be made by any suitable method. For example, in some embodiments the IAS may be made by first dissolving the potassium permanganate in water to form a solution. Then, the method further includes dissolving potassium dichromate in the solution, and then adding the chromium trioxide to the solution. The silver chromate, strontium hydroxide, calcium hydroxide and magnesium hydroxide may then be added to the solution, followed by the addition of sodium hydroxide. Then, the solution may be diluted with additional water depending on the desired concentration and volume. The pH of the solution may then be adjusted using additional sodium hydroxide and/or chromium trioxide, and/or boric acid. The solution may then be further diluted to the final, desired concentration and volume. The solution may also be filtered to remove any insoluble particulates if necessary to accommodate certain types of wicks. The diluting solvent may be either water and/or another solvent (such as, for example an alcohol) depending on the temperature of operation of the device in which the solution will be charged. Although the method described here lists certain actions in a certain order, it is understood that the method can include any order of the listed actions.

Upon charging the IAS according to embodiments of the present invention into a heat transfer device, the salts in the solution react with the surface of the heat transfer device (e.g., copper, aluminum or steel) to form an oxide layer on the surface of the device. The inorganic constituents of the IAS solution according to embodiments of the present invention create an environment surrounding the oxide layer in which cracks or fissures in the oxide layer will be passively healed by the ions in the IAS liquid and vapor. This continuous self-healing of the oxide layer by the ions in the IAS allows for continuous use of the heat transfer device without the creation of non-condensable gasses.

Passivation of the surface of the heat transfer device is achieved through a series of chemical reactions between the ions in the IAS and the material of the heat transfer device (e.g., copper or aluminum). For example, in forming a passivation layer on an aluminum surface, there are 9 reactions that take place between the IAS and the aluminum. These reactions can be grouped by those that passivate to form the passivation layer, and those that produce a hydrophilic reaction and thereby form a hydrophilic coating. The reactions described below are described with respect to an aluminum surface. However, it is understood that the IAS fluids according to embodiments of the present invention are not limited to use with aluminum surfaces, and can be used with any surface, including copper surfaces.

Passivation Reactions

The reactions that lead to the formation of the passivation layer can be further categorized into water ionization reactions, surface oxidation reactions, and the silver reaction. Each of these categories of reactions is discussed here.

Water Ionization

Generally speaking, liquid water will disassociate into its respective ions of hydrogen and hydroxide. This is seen in the water ionization reaction shown in Reaction 1 below. This reaction is the root cause of hydrogen gas formation when water is in contact with aluminum, because the hydrogen ion reacts with the aluminum surface, thereby releasing hydrogen gas. However, utilization of the IAS according to embodiments of the present invention substantially prevents this from taking place. Water ionization takes place regardless of the presence of the IAS chemicals. However, due to the powerful oxidizers in the IAs, aluminum will preferentially react with the oxidizers rather than the water ions.

$$H_2O(l) \leftrightarrow H^+(aq) + OH^-(aq) \quad \text{Reaction 1}$$

Surface Oxidation

When an aluminum surface is in contact with a stronger oxidizer than those in water, it prefers to react with the oxidizer rather than react with water. This forms a thin and compact layer of aluminum oxide that protects the surface. Because of the compact structure of the aluminum oxide, the aluminum surface is protected and insulated from further reactions. The permanganate in the IAS according to embodiments of the present invention is a much stronger oxidizer than water, and prevents reactions of aluminum with water. The permanganate concentration in the IAS is such that the aluminum surface will react with the permanganate only. This is because the permanganate is typically present in the IAS in excess relative to any other potential oxidizer. This reaction is shown below in Reaction 2.

$$2Al(s) + 2MnO_4^-(aq) + 2H^+(aq) \rightarrow Al_2O_3(s)\downarrow + 2MnO_2(s)\downarrow + H_2O(l) \quad \text{Reaction 2}$$

Permanganate is not the only oxidizer present in the IAS according to embodiments of the present invention. There are also chromates which also act as strong oxidizers. Permanganates are a much faster acting oxidizer, and are therefore useful in the initial coating of the aluminum surface, substantially preventing NCG formation upon first contact of the IAS with aluminum. Over time, however, the slower reacting chromates are available for oxidation to prevent formation of NCGs over the lifetime of the heat transfer device. The reaction of chromate with aluminum is shown below in Reaction 3, and the chromate balance reactions are shown below in Reactions 4 and 5.

$$2Al(s) + 2CrO_4^{2-}(aq) + 4H^+(aq) \rightarrow Al_2O_3(s)\downarrow + Cr_2O_3(s)\downarrow + 2H_2O(l) \quad \text{Reaction 3}$$

$$HCrO_4^-(aq) \leftrightarrow H^+(aq) + CrO_4^{2-}(aq) \quad \text{Reaction 4}$$

$$2CrO_4^{2-}(aq) + 2H^+(aq) \leftrightarrow Cr_2O_7^{2-}(aq) + H_2O(l) \quad \text{Reaction 5}$$

Figure 11:
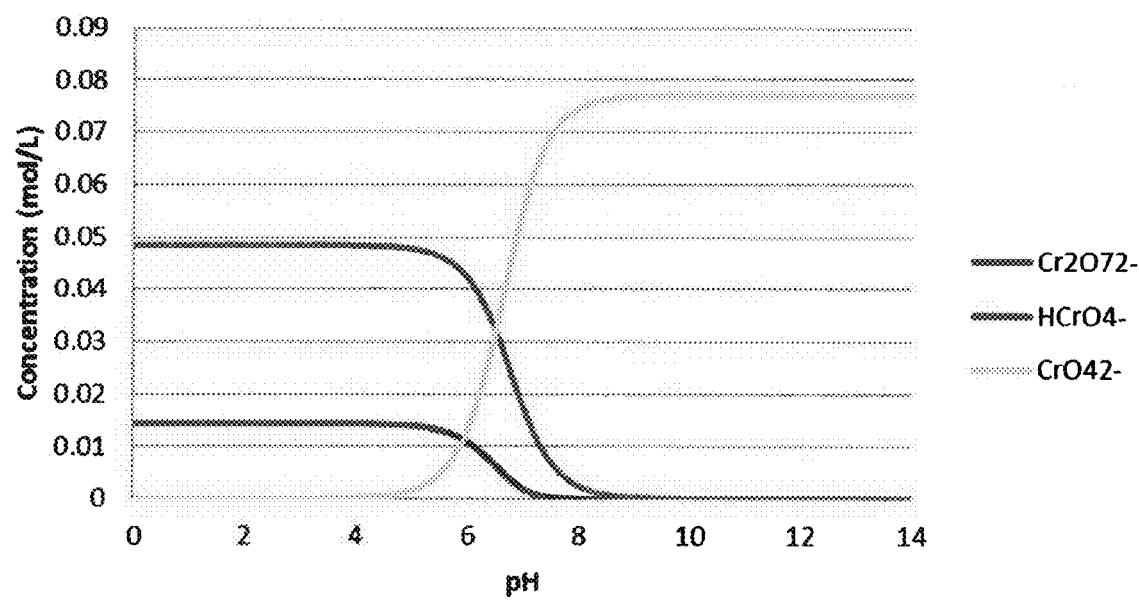
FIG. 11 is a graph depicting the relationship between pH number and the concentrations of chromium compounds in an inorganic aqueous solution according to an embodiment of the present invention.

As the pH number increases, chromate reactions will become dominant. FIG. 11 shows the relationship between pH number and the concentrations of chromium compounds in the solution according to Example 1 (below). As can be seen in FIG. 11, as pH increases, the concentration of chromate (i.e., $CrO_4^{2-}$) also increases. As noted above, manipulation of the pH number is one way to control the amount and type of deposits that make up the protective oxide layer on the surface of the heat transfer device.

Silver Reaction

Figure 12:
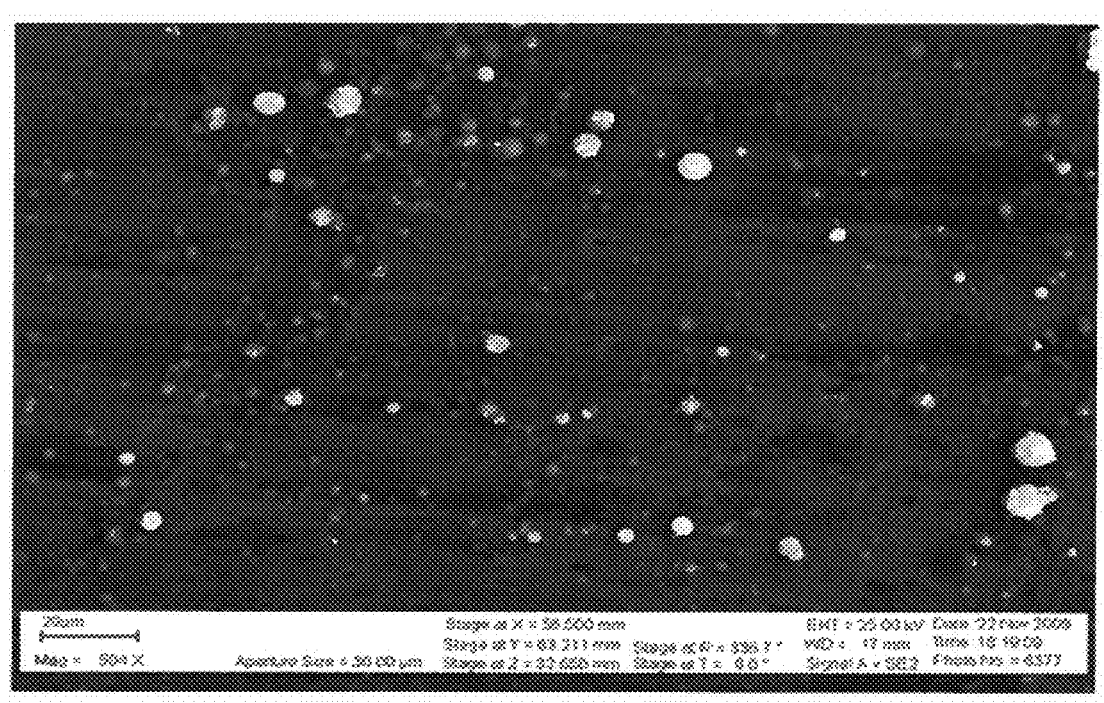
FIG. 12 is a scanning electron micrograph (SEM) of an aluminum surface having a passivation coating created from an IAS according to an embodiment of the present invention.
Figure 13:
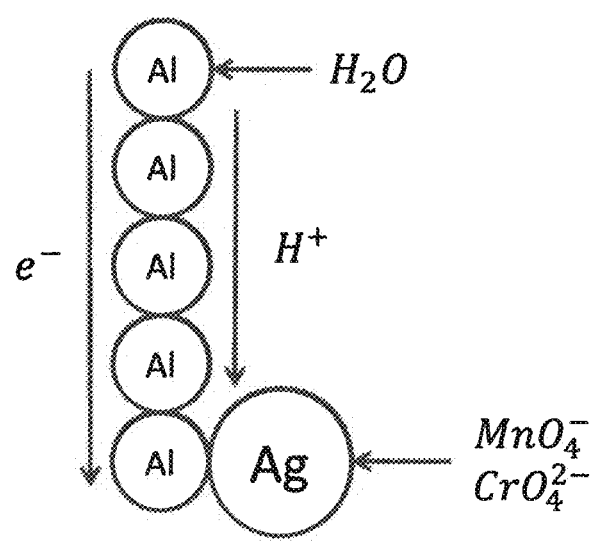
FIG. 13 is a schematic illustrating the reaction between the aluminum surface and an IAS according to an embodiment of the present invention.

Silver ions in the IAS according to embodiments of the present invention play a large role in the passivation of aluminum surfaces. In particular, silver ions are reduced easily by aluminum, and generate metallic silver. FIG. 12 is a scanning electron micrograph (SEM) of an aluminum surface having a passivation coating created from an IAS according to the solution of Example 1 (below). The white spots in the SEM of FIG. 12 are the metallic silver. The silver products can be thought of as an electronegativity bridge connecting the aluminum surface and the IAS, allowing the proper oxide coating to form everywhere in the tube, even if it is not in direct contact with the oxidizers in the IAS. The silver will not be coated in an oxide layer, and it is therefore effectively an interface between the aluminum and the oxidizers in the IAS. Aluminum oxide is an electrical insulator where aluminum is not, so the silver provides an efficient pathway for electrons to transfer throughout the tube. Without silver or its equivalent (such as gold or platinum) in the IAS, the passivating oxide coating might only exist in the evaporator section, and the pipe would fail. The silver permits the electrons resulting from the redox reaction to move and react with the oxidizers, rather than facilitating the production of gaseous hydrogen. This chemical reaction is shown below in Reaction 6. The resulting reaction between the aluminum surface and the IAS is an electrochemical problem which is illustrated in FIG. 13. The half reactions taking part in the scheme depicted in FIG. 13 are shown below in Reactions 7 through 9.

$$Al(s) + 3Ag^+(aq) \leftrightarrow 3Ag(s) + Al^{3+}(aq) \quad \text{Reaction 6}$$

$$2Al(s) + 3H_2O(l) - 6e^- \rightarrow Al_2O_3(s)\downarrow + 6H^+(aq) \quad \text{Reaction 7}$$

$$MnO_4^-(aq) + 4H^+(aq) + 3e^- \rightarrow MnO_2(s)\downarrow + 2H_2O(l) \quad \text{Reaction 8}$$

$$2CrO_4^{2-}(aq) + 10H^+(aq) + 6e^- \rightarrow Cr_2O_3(s)\downarrow 5H_2O(l) \quad \text{Reaction 9}$$

If the aluminum surface contacts water anywhere, it will lose three electrons and combine with the hydroxide ions in water to form aluminum oxide. In addition, electrons will go through the tube and silver bridge at the evaporating area, and then react with oxidizers. This means that anywhere the aluminum surface contacts water; it will be passivated.

Aluminum oxide is a basic oxide, which means that it will dissolve back into solution in an acidic environment. As such, a more basic solution facilitates better coating stability. The permanganate reaction with the aluminum casing not only produces the passivating coating but also results in a more basic solution by consuming hydrogen ions. If there is a crack or defect in the coating at any point during operation, the oxidizers will react with aluminum via the silver bridge and regenerate healthy coating at that location immediately. Since this reaction also makes the solution more basic, any self-healing occurring within the tube actually enhances the conditions for coating stability by maintaining a higher electrolyte pH (basic), thereby ensuring conditions in which NCG production is inhibited.

Hydrophilic Coating Reactions

The reactions discussed here govern the formation of a hydrophilic coating. The reactions governing the chromate ions in solution are shown below in Reactions 10 through 12. The chromium ions do not react with aluminum directly but form the foundation of a hydrophilic coating that is laid down on top of the aluminum oxide layer.

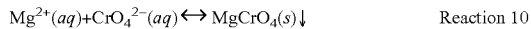

Reaction 10

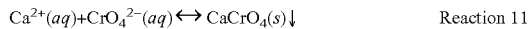

Reaction 11

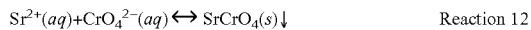

Reaction 12

Figure 14:
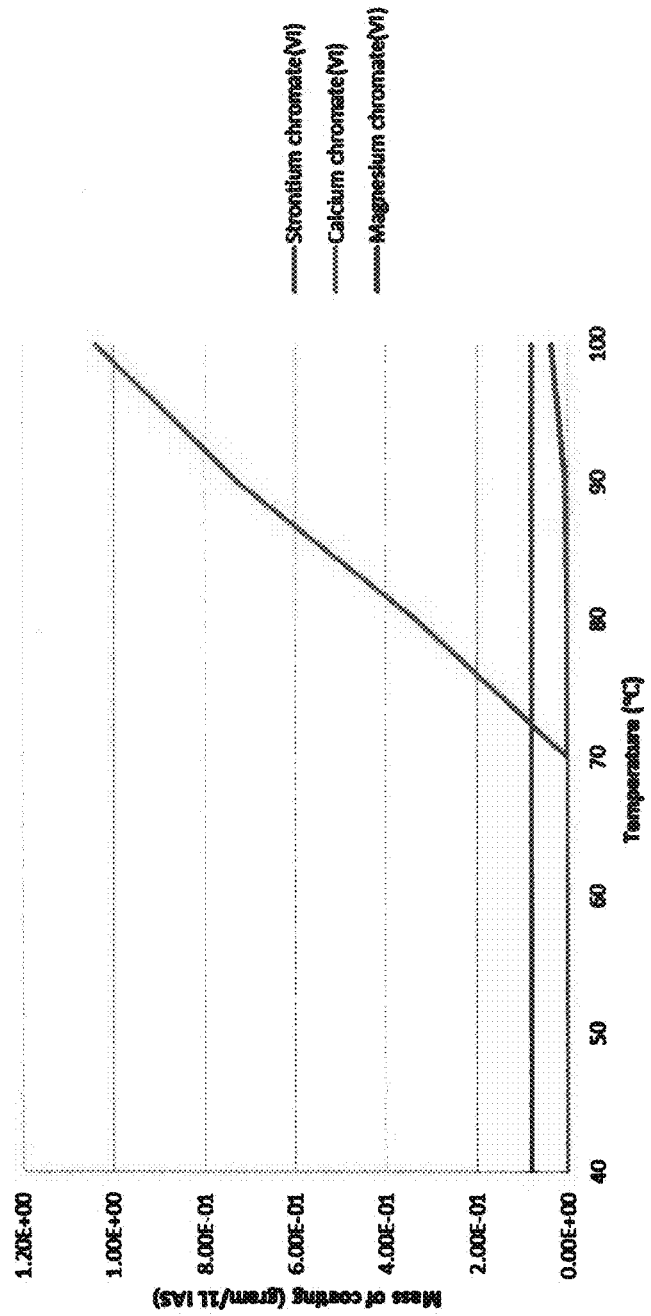
FIG. 14 is a graph depicting how changes in temperature affect the amount of the generated hydrophilic coating.

As either pH number or temperature is increased, hydrophilic coatings may be generated. A higher pH number leads to a larger amount of chromate in the chromium balance, and will make the generation of hydrophilic coatings easier. Moreover, because of the different physical properties, hydrophilic coatings will be generated at different temperature ranges. FIG. 14 shows how the change of temperature affects the amount of generated hydrophilic coatings. For the most part, these reactions are very similar to what is observed with copper.

The primary difference between aluminum and copper, with respect to the hydrophilic coating is the difficulty by which the coating is formed. Compared to the IAS reactions with copper, a hydrophilic coating will still form on aluminum surface, but higher temperatures are required because fewer hydrogen ions are consumed. Moreover, microstructures will prefer to form adjacent to the silver deposits instead of anywhere, as is the case with copper. There are methods that can be used to fix the problems above, such as increasing the initial pH number or the concentrations of magnesium, calcium, and strontium. However, raising the pH has a negative impact on the stability of the passivation reactions, and therefore increasing the pH too much will inhibit efficient passivation.

In summary, the IAS fluids according to embodiments of the present invention substantially prevent NCG formation by introducing stronger oxidizers into the aluminum that produce a compact aluminum oxide layer and substantially prevent the formation of gaseous hydrogen. The aluminum preferentially reacts with the oxidizers rather than the water, and this is facilitated by the presence of silver. Silver ions form solid silver on the surface of the aluminum which acts as an electronegativity bridge, thereby allowing electrons to freely move from the aluminum oxide to the oxidizers in the IAS liquid. The oxidation reactions make the IAS more basic, which makes it easier for the IAS to react with any aluminum that is exposed due to cracks in the oxide coating, making the process passive and self-healing.

According to some embodiments of the present invention, the IAS is used as a heat transfer medium in a heat transfer device. For example, the IAS can replace water as the working fluid in a phase change heat transfer device, and thereby improve the thermal performance of the device. Also, as the IAS according to embodiments of the present invention can be used with any casing material (including aluminum), using the IAS as the working fluid in a phase change heat transfer device enables the manufacture of lower cost and lighter weight devices. In particular, while the traditional working fluid (water) is not compatible with aluminum casings, the IAS according to embodiments of the present invention is compatible with aluminum. As aluminum is lower in cost and lighter in weight than copper, and the IAS is compatible with aluminum, the IAS enables the use and manufacture of lower cost, lighter weight devices (i.e., aluminum devices).

Additionally, use of the IAS according to embodiments of the invention in a heat transfer device improves the freeze/thaw capabilities of the device. The freeze-thaw capabilities of heat transfer devices are important for a variety of applications, particularly in the aerospace industry, where heat pipes using water as the working fluid have been suggested for use in space heat rejection radiator panels and other heat transfer systems. Spacecraft are subjected to extreme thermal environments that include long periods of very cold temperatures. The success of a heat transfer device in such applications relies on its ability to return from a completely frozen state to normal operating temperatures. Typically, a small amount non-condensable gas (NCG) is added to these devices to allow the frozen working fluid (e.g. water) to melt gradually preventing the fluid from freezing in the much colder condenser and causing the evaporator to dry-out. While the working fluid is frozen, the gas expands from the condensing region toward the evaporating region effectively forcing the vapor to condense closer to the evaporator. This allows the vapor and heat to be retained near the evaporator. As more heat is added and further evaporation occurs, the increase in vapor pressure begins to compress the NCG toward the condensing region, exposing more condensing surface until the heat pipe reaches normal operating conditions.

The IAS according to embodiments of the present invention can improve the freeze/thaw properties of the heat transfer device. In particular, surfaces coated with an IAS according to embodiments of the present invention may allow melting of water on the surface about twice as fast as melting water on a clean surface. This is due to the wicking ability of the coating imparted by the IAS, which allows a reduced thermal resistance between the heating surface and ice.

Figure 15A:
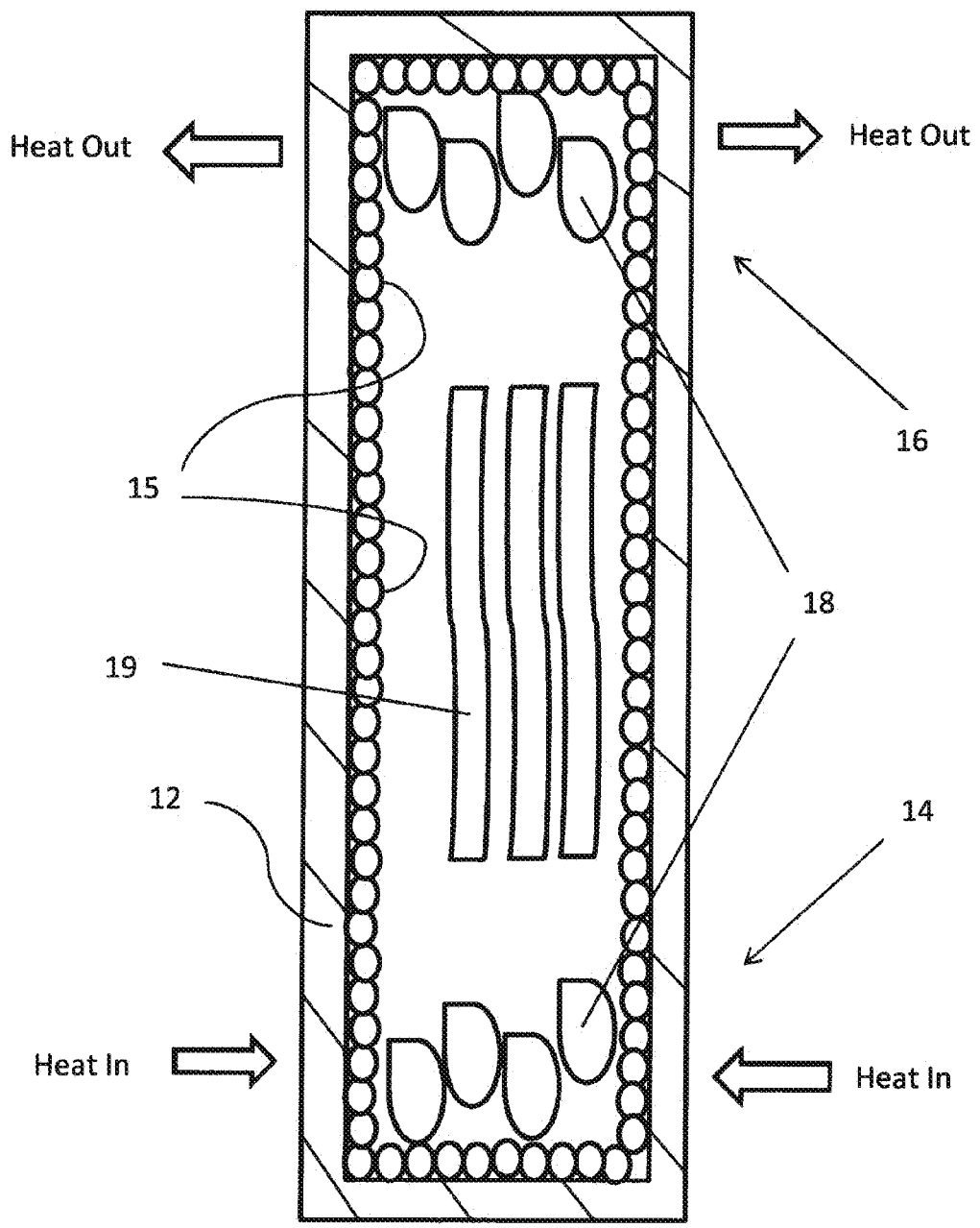
FIG. 15A is a schematic cross-sectional view of a heat transfer device according to one embodiment of the present invention.
Figure 15B:
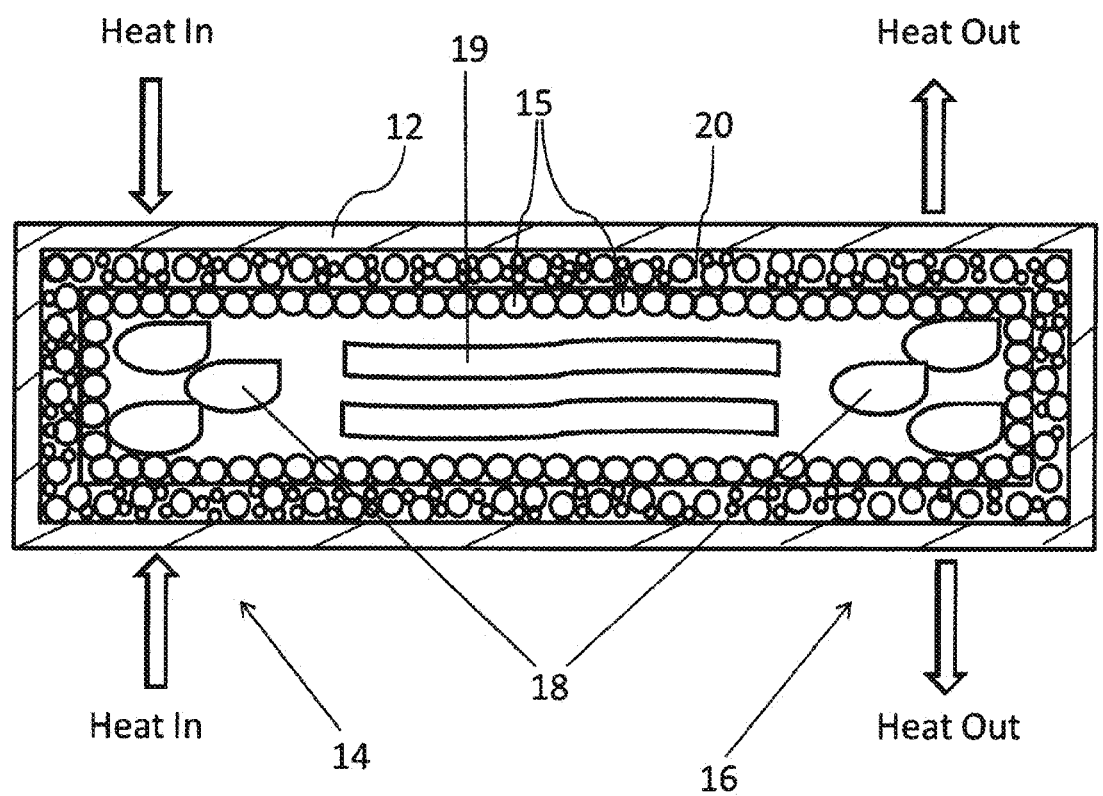
FIG. 15B is a schematic cross-sectional view of a heat transfer device according to another embodiment of the present invention.

In some embodiments, the IAS is used as a working fluid in a closed evaporating-condensing heat transfer device (e.g., a heat pipe). According to some embodiments of the present invention, as shown in FIGS. 15A and 15B, the heat transfer device 10 includes an elongated member 12 (e.g., a pipe or tube) having a hot interface 14 at one end and a cold interface 16 at the opposite end. The elongated member 12 is charged with the IAS 18 according to embodiments of the present invention, as described above. In use, the IAS 18 is in liquid form 18 at the hot interface 14 (or evaporator end), and upon heating at the hot interface, the liquid turns to vapor 19 and travels to the cold interface 16 (or condenser end). At the cold interface 16, the vapor condenses back into a liquid 18 and travels back to the hot interface 14 where the evaporation/condensation cycle begins anew. When the IAS 18 is charged in the elongated member 12, the IAS reacts with the surface of the elongated member and forms a passivation layer 15 on the surface of the elongated member.

The condensed liquid can travel back to the hot interface by any suitable means, for example gravity or capillary action. In some embodiments, for example, as shown in FIG. 15A, the elongated member 12 is positioned such that the condenser end 16 lies above the evaporator end 14 so that when the vapor is condensed back into a liquid, gravity will force the liquid to return downward to the evaporator end 14. Although FIG. 15A depicts the elongated member 12 as generally in a vertical orientation, it is understood that the elongated member 12 may be positioned in any orientation that would allow gravity to force the condensed liquid back toward the evaporator end 14. For example, as would be appreciated by those of ordinary skill in the art, the elongated member 12 could be positioned at any angle so long as the condenser end 16 is positioned higher than the evaporator end 14.

According to other embodiments, however, the elongated member 12 can be positioned in any orientation, and capillary action may force the condensed liquid back toward the evaporator end 14. In these embodiments, as shown in FIG. 15B, the elongated member 12 may further include a wick 20. The wick 20 absorbs the condensed liquid at the condenser end 16 and forces the liquid back toward the evaporator end 14 by capillary action. In addition, the wick distributes the liquid around the evaporator end to any area where heat is likely to be received by the elongated member. Sometimes, driving the condensed liquid back toward the evaporator end and wicking the liquid around the evaporator end require different wicks. Accordingly, in some embodiments, the heat transfer device 10 may include more than one wick. Also, when the IAS is charged in the elongated member 12, the IAS reacts with the surface of the wick 20 and forms a passivation layer 15 on the surface of the wick 20.

As would be understood by those of ordinary skill in the art, selection of the wick depends on many factors, including the properties of the working fluid. However, in general, the wick may be any suitable material capable of exerting the appropriate capillary pressure on the condensed liquid, such as any suitable porous material. Indeed, the wick may be made of any wick material known in the art so long as it is wettable and compatible with the IAS. Some nonlimiting examples of suitable wick materials include porous structures made of materials such as steel, aluminum, nickel or copper having various ranges of pore sizes. In some embodiments, for example, the wick is made of aluminum, an aluminum alloy, copper, a copper alloy, stainless steel, or a combination thereof. In some exemplary embodiments, the wick is made of copper or a copper alloy. Such wicks may be fabricated from metal foams or felts (felts being more common). When using felts, various pore sizes can be produced by varying the pressure on the felt during assembly. In addition, an arterial structure may be molded into the felt using removable metal mandrels. Other nonlimiting examples of suitable wick materials include fibrous materials, such as ceramic fibers and carbon fibers. The wick may take any suitable porous structure such that it exerts the appropriate amount of capillary pressure on the condensed liquid to force it to return to the evaporator end of the heat transfer device. For example, the wick may be a sintered powder, a grooved tube, a screen mesh or a combination thereof. Indeed, any wick known in the art can be used.

In some embodiments, for example, the wick may be a bi-porous wick. A bi-porous wick is constructed by bonding or sintering spherical particles together into ingots at a desired porosity. The ingots are then broken up and sieved into semi-uniform cluster sizes. A cluster is defined as a mass of porous particles with a characteristic diameter. The clusters of a desired size are then filled into a mold and bonded or sintered together so that two distinct size distributions of pores are present, hence a bi-porous wick. Smaller pore sizes are found within the clusters, and larger pore sizes are found between the clusters. The thickness of the wick is defined to be the so-called depth of the mold in which the bi-porous material is filled. The dimensions of the components of the bi-porous wick are not particularly limited, and can have any desired value. In some embodiments, for example, a bi-porous wick may have a particle size of about 40 to about 80 mm, clusters having a size of about 100 to about 400 mm, and thickness of about 600 to about 1000 mm. For example, in some embodiments, a bi-porous wick has a particle size of about 60 to about 70 mm, clusters of about 250 to about 350 mm, and a thickness of about 750 to about 850 mm. In one exemplary embodiment, a bi-porous wick has a particle size of about 69 mm, clusters of about 300 mm, and a thickness of about 800 mm.

As discussed above, the desired concentration and composition of the components in the IAS depends on the material of the heat transfer device, the available effective area, and the type of heat transfer device in which the IAS is utilized. For example, in a heat transfer device wicked by a porous material, the concentration of the solutes in the IAS should be sufficiently high to provide a layer of coverage over the available surface of the particles of the wick to enhance the wetting properties, but not so high as to clog the pores of the wick.

In some embodiments, however, the IAS forms a porous structure or coating on the surface of the device, which may act as a wick. Indeed, the porous coating affects both the wettability and the capillarity of the surface of the device. As such, in some embodiments, a heat transfer device charged with the IAS according to embodiments of the present invention need not include a wick. Also, as the coating formed from the IAS during operation of the heat transfer device forms structure that can act as wick, heat transfer devices according to some embodiments of the present invention do not include an additional wick, and can still be used in orientations previously only available when a wick is used (i.e., the heat transfer devices, even without the wick, do not rely on gravity to return the condensed liquid to the evaporator end).

In embodiments in which the heat transfer device does include an additional wicking material, the IAS may form a coating and/or deposits on the wicking material, which may affect the wetting and capillarity of the wicking material. In addition, the contact area between the clusters in a bi-porous wick can be increased due to the presence of the deposits, which provide more heat conduction paths through the solid portions of the wick network.

Figure 5:
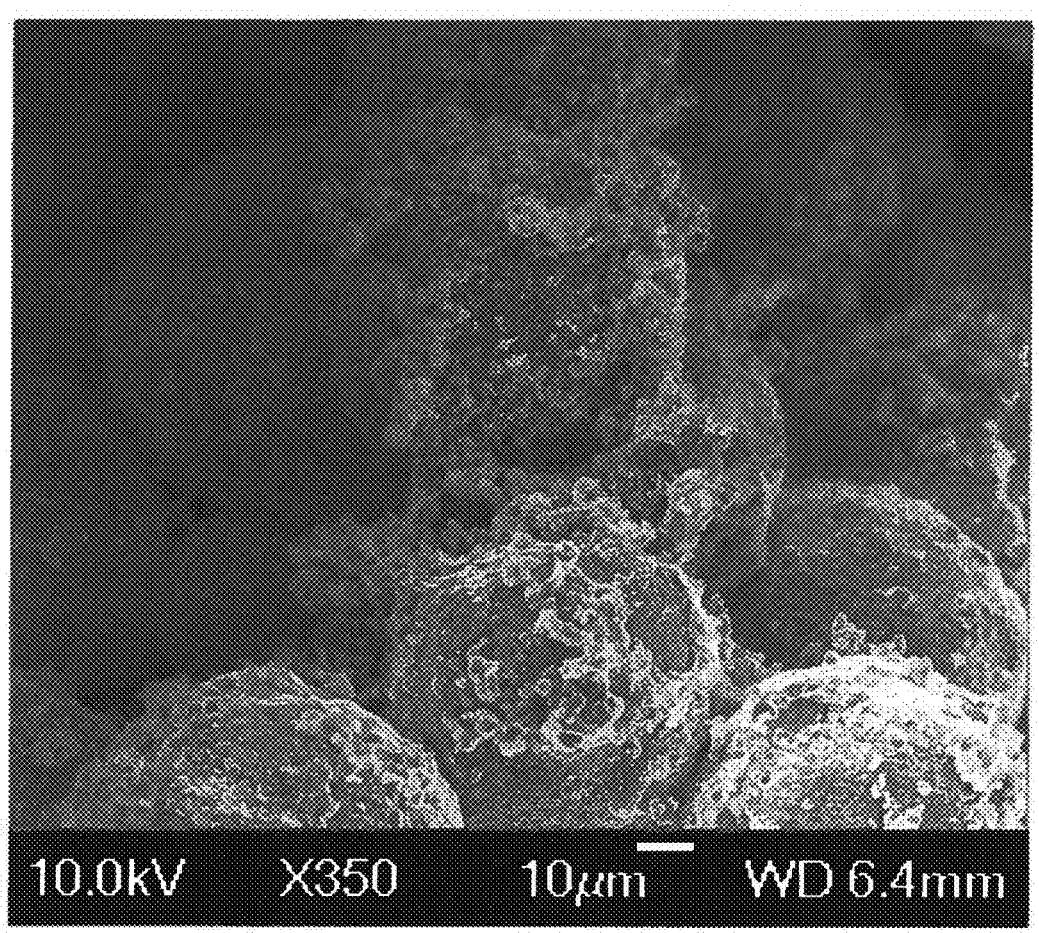
FIG. 5 shows a Scanning Electron Microscope ("SEM") image of a bi-porous wick from a copper device charged with an IAS.
Figure 6:
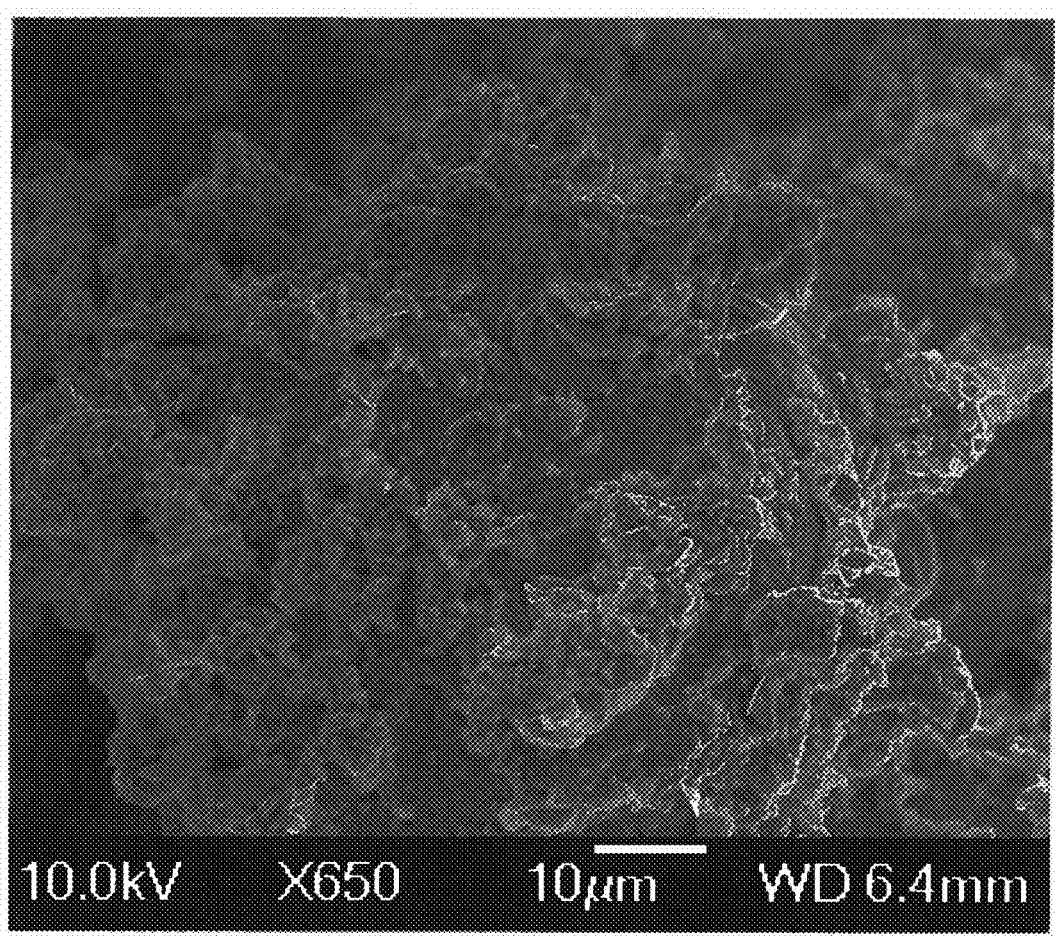
FIG. 6 shows a porous deposit formed on the surface of an approximately 60 μm copper particle.

FIG. 5 is a Scanning Electron Microscope ("SEM") image of a bi-porous wick from a copper device charged with an IAS according to embodiments of the present invention. As can be seen in FIG. 5, a porous deposit is present on the wick. The SEM image was taken at 10.0 KV, X350 with a JEOL JSM-6700F Field Emission SEM. FIG. 6 is an SEM image showing a porous deposit on the surface of an approximately 60 µm copper particle. These deposits are desirable because they increase wetting of the working fluid through the wick. However, too many deposits will clog the wick and be detrimental to performance. Accordingly, the amount of deposits on the wick should be controlled. In some embodiments, for example, the deposits may be about 10 microns or less in thickness and periodic in structure.

While the heat transfer device 10 is described and illustrated here as including an elongated member 12, it is understood that the elongated member is not limited to any particular structure. Specifically, the elongated member 12 is not limited to a tubular or pipe structure as shown, but instead can be any known heat transfer structure. For example, in addition to having the structure of a traditional heat pipe, the heat transfer device 10 according to embodiments of the present invention can also be a flat heat pipe or a loop heat pipe.

The elongated member is made of any suitable conductive material. For example, in some embodiments, the elongated member is made of copper, a copper alloy, aluminum, an aluminum alloy, or stainless steel. In some exemplary embodiments, the elongated member is made of aluminum or an aluminum alloy. Some nonlimiting examples of suitable aluminum alloys include alloys having a majority of aluminum, but also including at least one additional element selected from silicon, iron, chromium, magnesium, copper, manganese, zinc and titanium. One exemplary such alloy is aluminum alloy 6061, which includes aluminum as the base metal at about 95.85% to about 98.56%, and silicon and magnesium as the main alloying components, at about 0.4% to about 0.8%, and about 0.8 to about 1.2%, respectively. Alloy 6061 also includes about 0.7% iron, 0.15% manganese, about 0.25% zinc, about 0.15% titanium, about 0.15% to about 0.4% copper, and about 0.04% to about 0.35% chromium. Another exemplary aluminum alloy is aluminum alloy 3003, which includes aluminum as the base metal at about 96.9% to about 97.55%, and manganese as the main alloying component at about 1 to about 1.5%. Alloy 3003 also includes about 0.6% silicon, about 0.7% iron, about 0.05 to about 0.20% copper, and about 0.10% zinc. Yet another exemplary aluminum alloy is aluminum alloy 5052, which includes aluminum as the base metal at about 95.9% to about 96.7%, and magnesium as the main alloying component at about 2.2 to about 2.8%. Alloy 5052 also includes about 0.25% silicon, about 0.4% iron, about 0.1% copper, about 0.1% manganese, about 0.15% to about 0.35% chromium and about 0.1% zinc.

The heat transfer device may be assembled by any known method. For example, the heat transfer device may be assembled by charging the cavity of the elongated member with the inorganic aqueous solution, and sealing the elongated member at both ends. According to another embodiment, the heat transfer device may be made by installing a wick on the inner surface of the elongated member so that the wick lines the cavity, charging the inorganic aqueous solution in the cavity, and sealing both ends of the elongated member. Sealing the ends of the elongated member may be accomplished by any suitable means, e.g., welding or soldering end caps to the ends of the elongated member, as well as any other means.

As discussed above, the IAS according to embodiments of the present invention modifies the surface properties of the heat transfer device, leading to increased capillarity (even in the absence of a wick) and an improved evaporating contour at the interline. In particular, as discussed above, the IAS reacts with the material of the surface of the heat transfer device, resulting in the creation of a passivation layer on the surface of the device that prevents the reaction of water with the material of the device. FIG. 1 shows a theoretical interline modification caused by the reaction of the IAS with the surface material of a heat transfer device. The interline is the transition region where the meniscus of the liquid IAS comes close to the surface of the device (or the surface of the wick when present). More specifically, the interline is a small transition region of increased evaporation between the high conduction resistance in the bulk meniscus and the strong interfacial resistance in the adsorbed film region. The surface augmentation resulting from the reaction of the IAS with the material of the device lowers the contact angle of the liquid and extends the interline, as shown in FIG. 1. In particular, as shown in FIG. 1, the interline is the transition region between the absorbed film region and the bulk meniscus region. In the absorbed film region, the absorbed thin film is held in place by strong adhesion forces between the solid surface and the liquid, which lead to negligible evaporation. Also, in the bulk region, the interface curvature becomes nearly constant, and the film thickness increases rapidly, leading to poor heat transfer. However, heat flux reaches its maximum in the transition region (or interline), which accounts for more than 60% of the total heat transfer in the meniscus. Accordingly, a larger transition region is desirable, and as shown in FIG. 1, heat transfer devices using the IAS have extended transition regions (or interlines). Indeed, the physical and chemical modifications made to the surface of the heat transfer device by the IAS lead to increased capillarity due to the formation of a porous layer, better wetting behavior of the surface, and, consequently, a more effective evaporating meniscus.

Additionally, the chemical constituents of the IAS according to embodiments of the present invention yield a surface coating that has an anti-corrosive effect. This allows the IAS, an aqueous solution, to be used in applications (e.g., aluminum based heat transfer devices) for which aqueous solutions were not previously possible or practical. In particular, as described above, without a special coating to prevent the reaction of water with the aluminum in an aluminum-based heat transfer device, the water will react with the aluminum (or aluminum alloy) surface to form hydrogen, a non-condensable gas ("NCG"). The formation of NCGs from such a reaction rapidly results in the failure of the heat transfer device, as the NCGs prevent energy from being rejected at the condenser end. Some coatings have been proposed in an attempt to prevent the formation of NCGs, but those coatings are generally applied manually and are not replenished. As a result, if the coating is damaged anywhere, NCGs will form from the reaction of water with the device surface at the location of the damaged coating, resulting in device failure. However, as described above, the IAS according to embodiments of the present invention has a self-healing property due to the constant presence of ions in the working fluid. Specifically, as the ions remain in the working fluid during operation of the heat transfer device, they will react with any bare aluminum (or aluminum alloy) surface, thereby healing any damaged areas of the coating and preventing damage to the coating from exposing the surface of the device to the water in the IAS. As the IAS provides a self-healing coating on the surface of the device, the IAS substantially prevents reaction of the water in the IAS with the surface of the device, thereby substantially preventing the formation of NCGs.

The self-healing property of the coating imparted by use of the IAS according to embodiments of the present invention enables use of an aqueous solution (having high specific heat capacity) with an aluminum based heat transfer device (having attractive weight and cost savings as well as desirable thermal properties). Accordingly, using the IAS according to embodiments of the present invention, many currently operating heat transfer devices using water as the working fluid can be replaced with lighter, more efficient aluminum heat transfer devices, thereby cutting operational cost.

The following Examples and Comparative Examples are presented for illustrative purposes only, and do no limit the scope of the present invention.

Example 1

An IAS working fluid was prepared by dissolving 0.44 g potassium permanganate in 500 ml of deionized water in a 1 L flask with stirring. Next, 8.5338 g of potassium dichromate was added and dissolved. 1.9058 g of chromium trioxide was added to the solution while stirring (this can potentially generate heat). Then, 0.0065 g silver chromate, 0.1042 g strontium hydroxide, 0.9571 g calcium hydroxide, and 0.0335 g magnesium hydroxide were added to the solution while stirring. 0.2678 g sodium hydroxide was then added to the solution while stirring. The solution was then diluted to 900 ml with water. The pH of the solution was adjusted to 6.22 using additional chromium trioxide or sodium hydroxide. The solution was then transferred to a volumetric flask, diluted to 1 L with water. No insoluble particulates were produced in this process, so no filtering was necessary.

Comparative Example 2

A working fluid was prepared using water alone.

Figure 2:
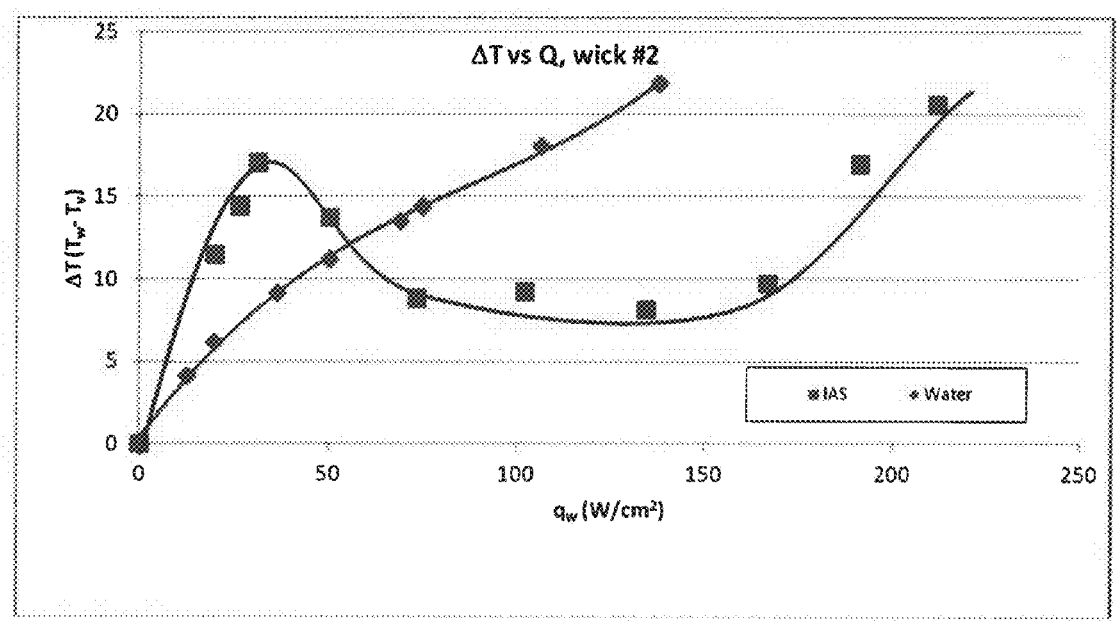
FIG. 2 shows experimental results comparing heat transfer of water and an inorganic aqueous solution ("IAS") in a heat transfer device according to an embodiment of the invention.
Figure 24:
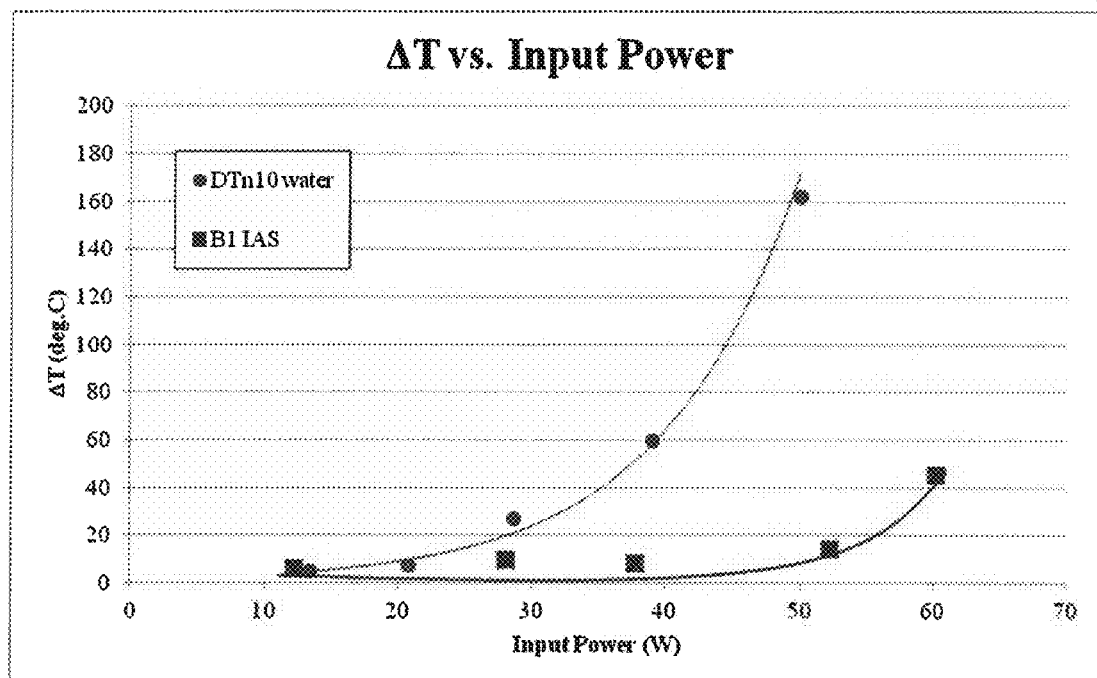
FIG. 24 is a graph comparing the $\Delta T$ vs. input power of the IAS of Example 1 with a water working fluid.

FIG. 2 is a graph comparing the heat transfer characteristics of the IAS of Example 1 with the working fluid of Comparative Example 1 (i.e., water). Each working fluid was charged in a copper porous evaporator using a copper bi-porous wick having a particle size of 69 mm, clusters of 300 mm, and a thickness of 800 mm. FIG. 24 shows that the heat pipe charged with the IAS of Example 1 exhibited a lower $\Delta T$ at higher heat fluxes than the heat pipe charged with water (i.e., the working fluid of Comparative Example 1). The lower ΔT at higher heat fluxes achieved by the IAS of Example 1 indicates a marked increase in heat transfer efficiency.

Figure 3:
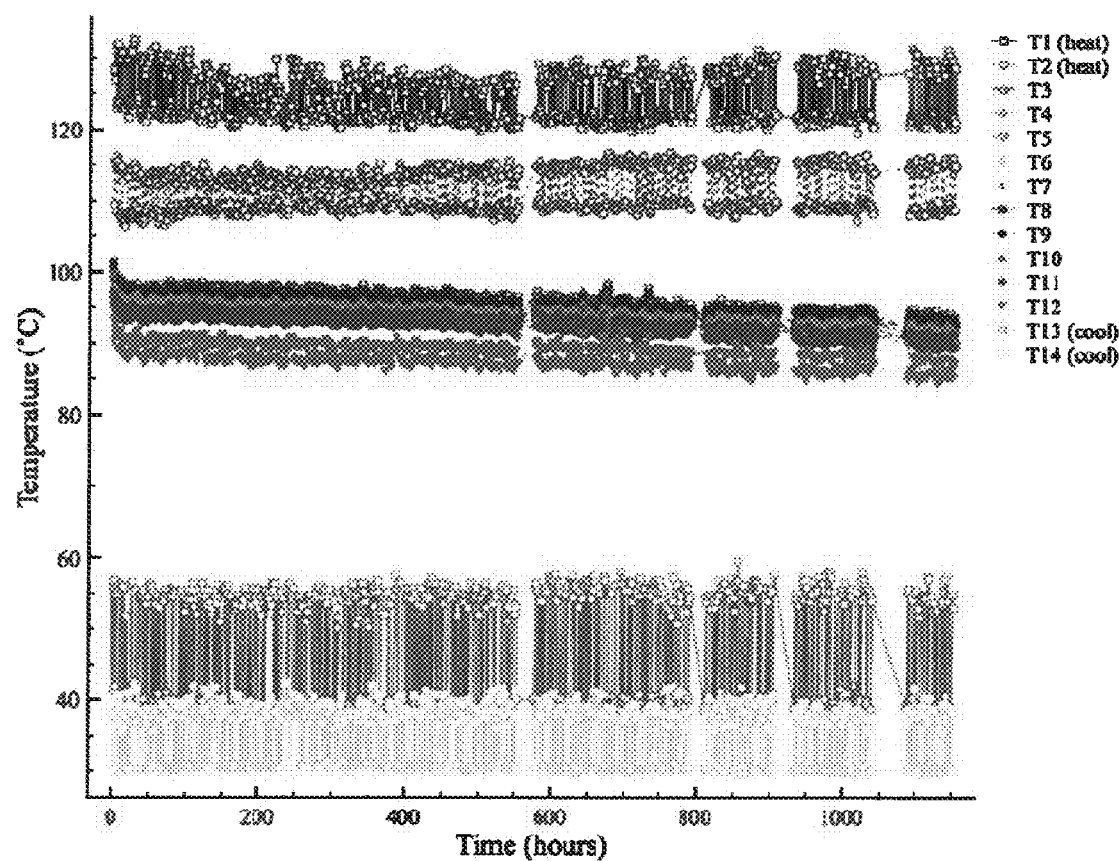
FIG. 3 shows life time testing results for a tube of Aluminum alloy 6061 charged with an IAS.
Figure 4:
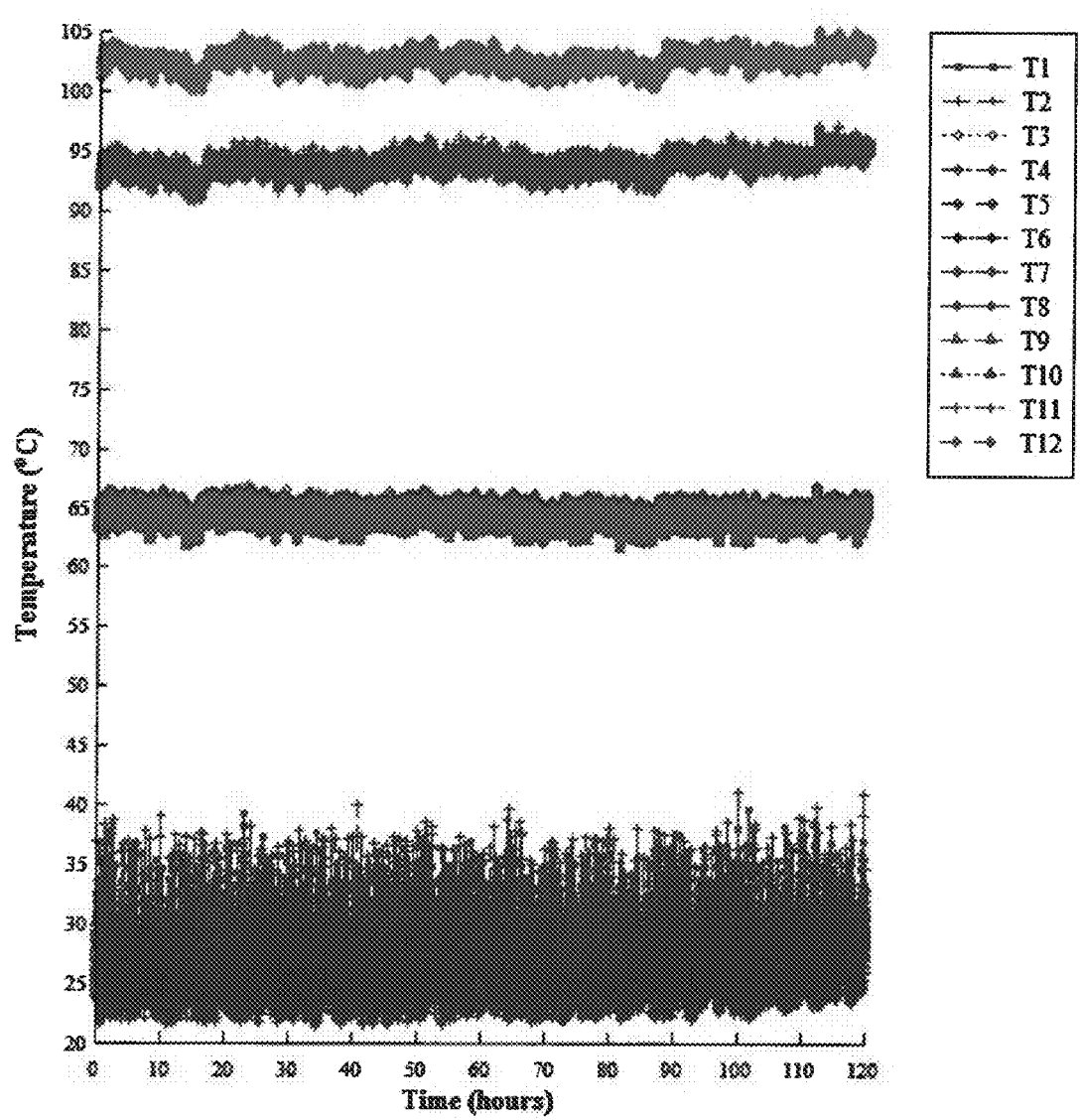
FIG. 4 shows life time testing results for a tube of aluminum alloy 3003 charged with an IAS.

FIG. 3 is a graph of the life time testing results for a heat pipe made of aluminum alloy 6061 that was charged with the IAS of Example 1. FIG. 4 is a graph of the life time testing results for a heat pipe made of aluminum alloy 3003 that was charged with the IAS of Example 1. The aluminum heat pipes charged with the IAS of Example 1 were tested for over 1000 hours. Despite some oscillation due to varying load on the heaters from the wall plug, the average trend of the condenser temperatures (which are the bottom temperatures in the graph and are marked "cool") was steady over time, indicating normal operation. If a failure had occurred, as would be the case if water were used instead of the IAS, the condenser temperatures would have progressively declined over time as non-condensable gases built up in the condenser, thereby blocking heat transfer. The failure in water charged tubes is usually noted within hours of operation if bare aluminum is used, depending on the supplied power.

The performance of phase-change heat transfer devices, such as heat pipes, depends on a number of factors, including liquid properties, liquid charge amount, wick characteristics, and the interfacial bonding in the wick matrix and between the container and the wick, etc. Capillarity of the wick is also a factor in the performance of the device. As expressed by the Young-Laplace equation, capillarity is a function of the surface tension of the working liquid, the average pore size of the wick, and the contact angle at the contact line. Therefore, minimizing the contact angle is desirable. Accordingly, embodiments of the IAS alter the chemical and physical properties of the surface, such that the surface resulting from reaction with the IAS is more hydrophilic than the original (unreacted) surface, thereby minimizing the contact angle. To determine the effectiveness of different formulations for a particular substrate, the first step is to quantify the change in the wetting property (i.e., the contact angle) of the treated surface with respect to the untreated surface. Accordingly, a goniometer (First Ten Angstroms 4000 A) was used to measure the contact angle of water droplets on various surfaces at room temperature and atmospheric pressure.

Figure 7A:
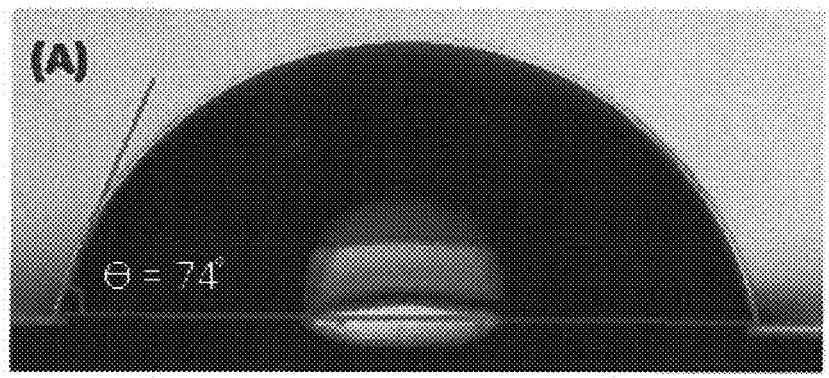
FIG. 7A shows Sessile DI-water droplets on a smooth clean copper surface.
Figure 7B:
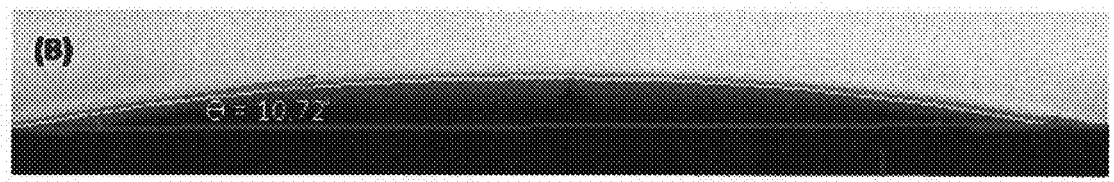
FIG. 7B shows Sessile DI-water droplets on an IAS-treated copper surface.
Figure 7C:
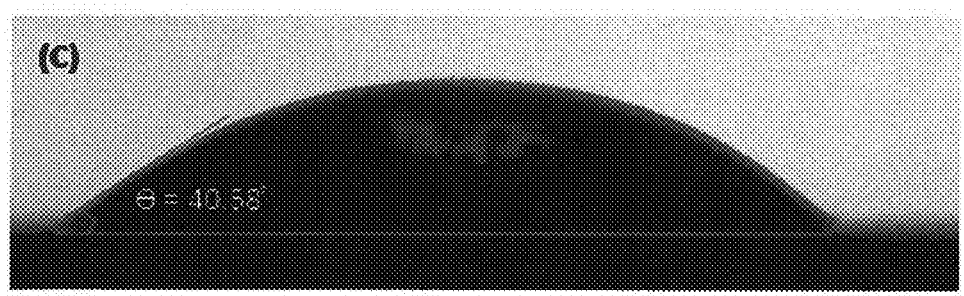
FIG. 7C shows Sessile DI-water droplets on a copper surface after an IAS chemical residue was washed away with water.

FIG. 7A is a photograph of sessile DI-water droplets on a smooth, untreated copper surface. FIG. 7B is a photograph of sessile DI-water droplets on an IAS-treated copper surface. FIG. 7C is a photograph of sessile DI-water droplets on a copper surface after the IAS chemical residue was washed away with water. As shown in FIGS. 7A-7C, the wetting properties (as measured by contact angle) of a copper substrate are improved when surface treated using the IAS according to embodiments of the present invention.

Figure 8A:
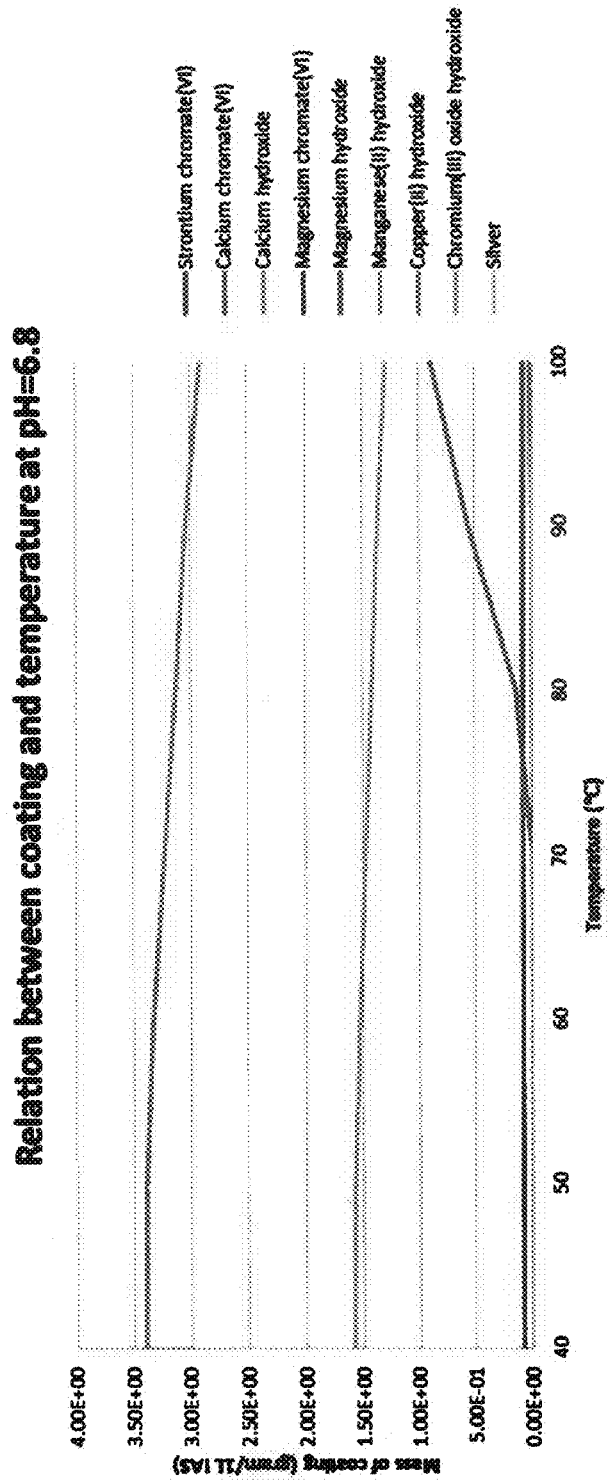
FIG. 8A is a graph depicting the relationship between the mass of several coating components and temperature at a pH of 6.8 for an IAS according to an embodiment of the present invention.
Figure 8B:
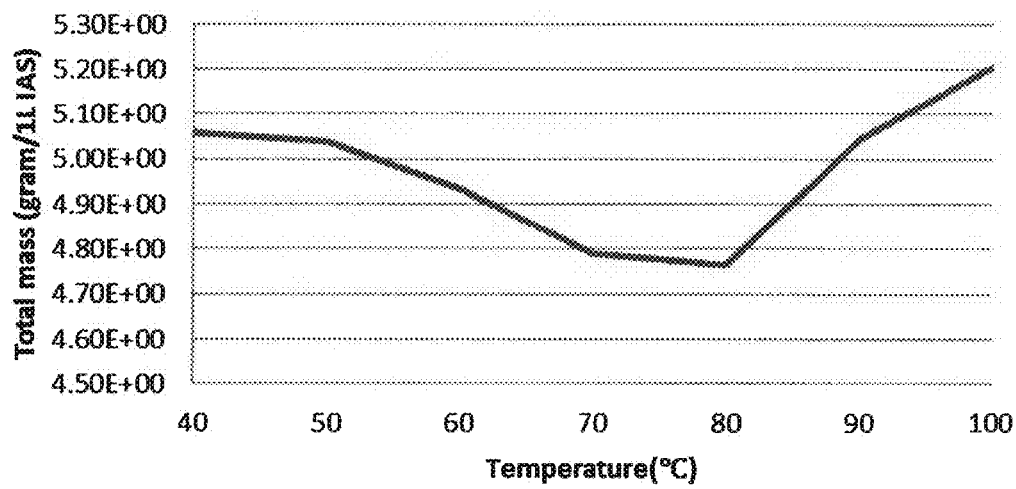
FIG. 8B is a graph depicting the relationship between the total mass of all coating components and temperature at a pH of 6.8 for an IAS according to an embodiment of the present invention.
Figure 8C:
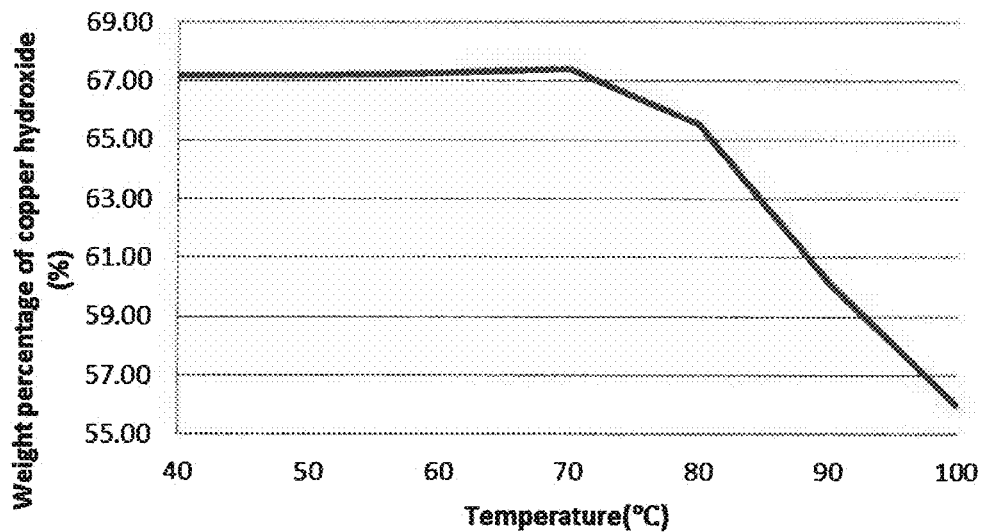
FIG. 8C is a graph depicting the relationship between the weight percent of copper hydroxide and temperature at a pH of 6.8 for an IAS according to an embodiment of the present invention.
Figure 9A:
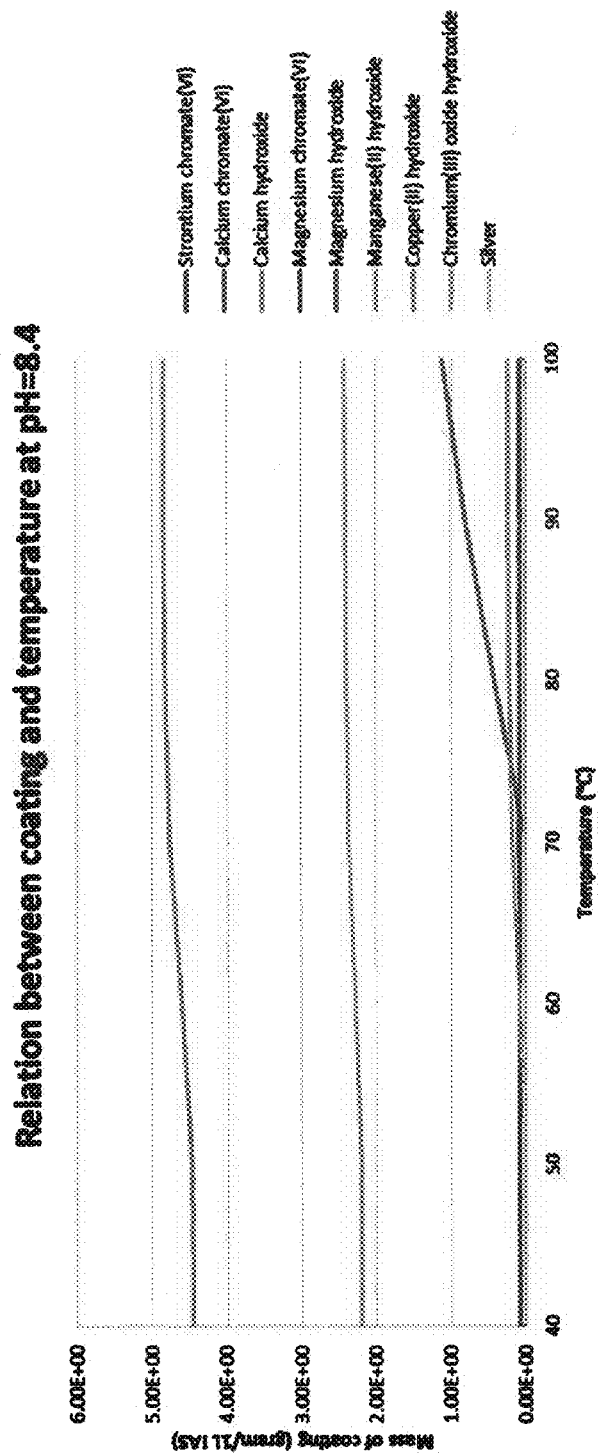
FIG. 9A is a graph depicting the relationship between the mass of various coating components and temperature at a pH of 8.4 for an IAS according to an embodiment of the present invention.
Figure 9B:
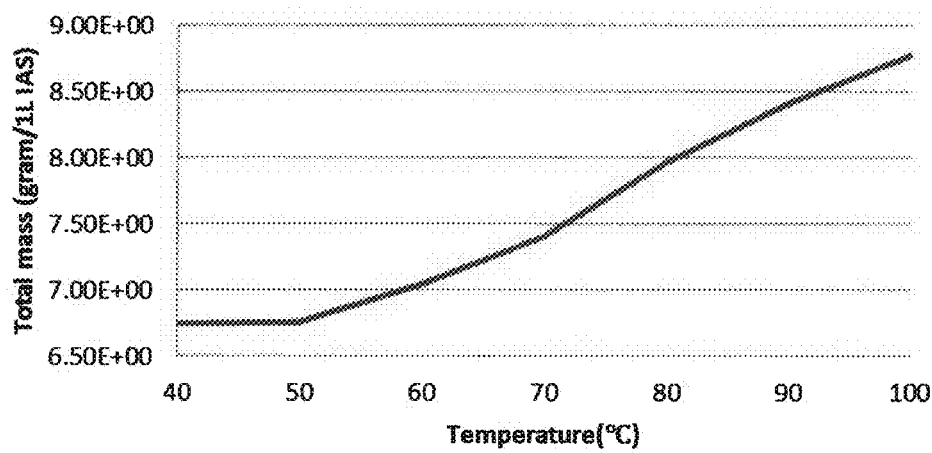
FIG. 9B is a graph depicting the relationship between the total mass of all coating components and temperature at a pH of 8.4 for an IAS according to an embodiment of the present invention.
Figure 9C:
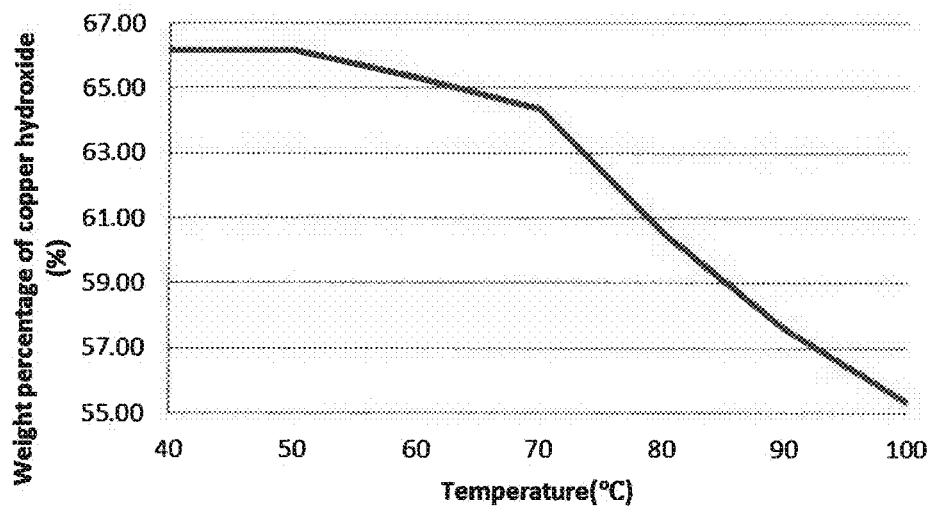
FIG. 9C is a graph depicting the relationship between the weight percent of copper hydroxide and temperature at a pH of 8.4 for an IAS according to an embodiment of the present invention.
Figure 10A:
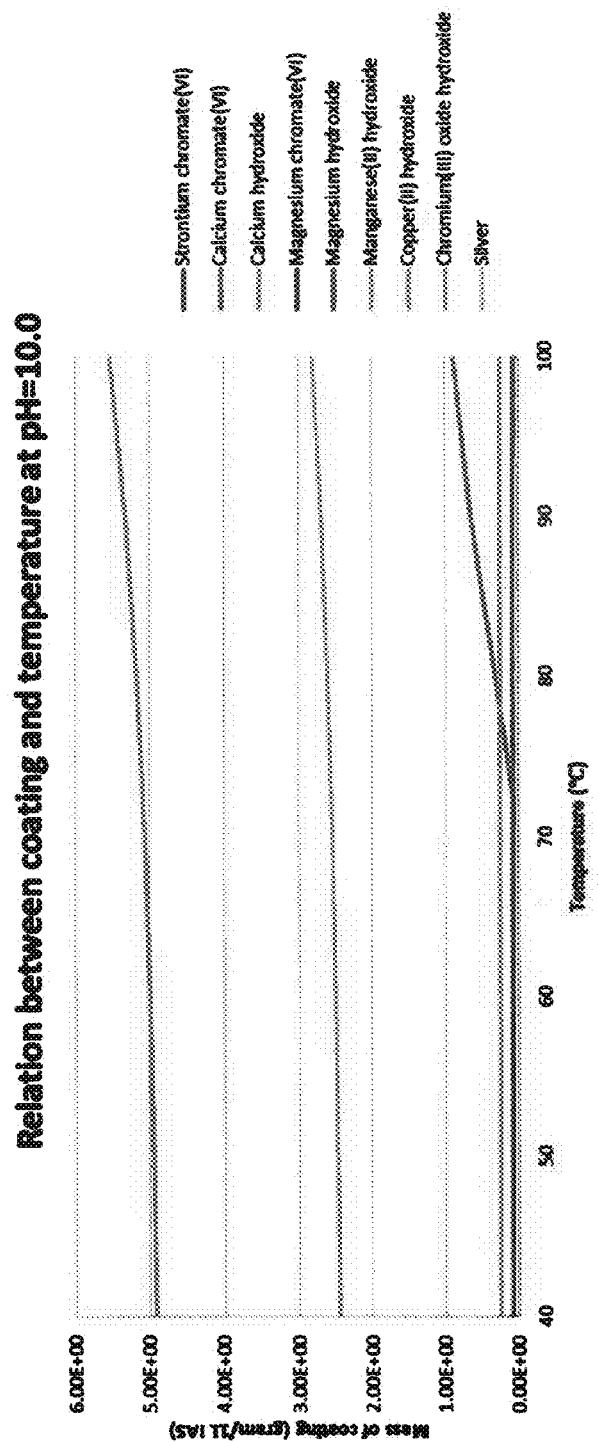
FIG. 10A is a graph depicting the relationship between the mass of various coating components and temperature at a pH of 10.0 for an IAS according to an embodiment of the present invention.
Figure 10B:
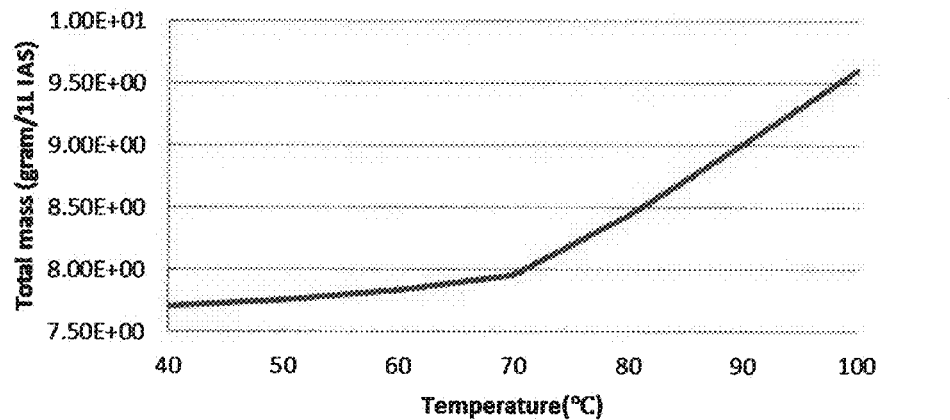
FIG. 10B is a graph depicting the relationship between the total mass of all coating components and temperature at a pH of 10.0 for an IAS according to an embodiment of the present invention.
Figure 10C:
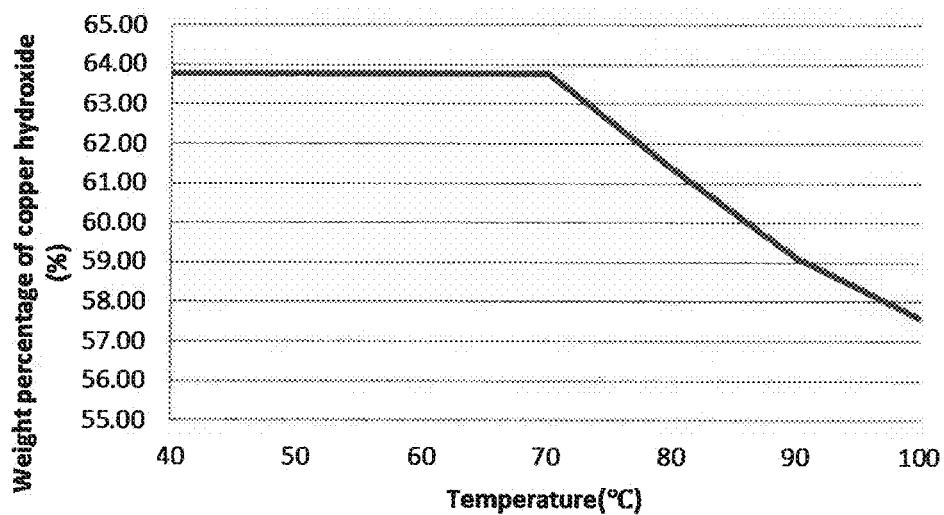
FIG. 10C is a graph depicting the relationship between the weight percent of copper hydroxide and temperature at a pH of 10.0 for an IAS according to an embodiment of the present invention.

FIG. 8A is a graph showing the relationship between the mass of various coating components and temperature at a pH of 6.8. FIG. 8B is a graph showing the relationship between the total mass of all coating components and temperature at a pH of 6.8. FIG. 8C is a graph showing the relationship between the weight percent of copper hydroxide and temperature at a pH of 6.8. FIG. 9A is a graph showing the relationship between the mass of various coating components and temperature at a pH of 8.4. FIG. 9B is a graph showing the relationship between the total mass of all coating components and temperature at a pH of 8.4. FIG. 9C is a graph showing the relationship between the weight percent of copper hydroxide and temperature at a pH of 8.4. FIG. 10A is a graph showing the relationship between the mass of various coating components and temperature at a pH of 10.0. FIG. 10B is a graph showing the relationship between the total mass of all coating components and temperature at a pH of 10.0. FIG. 10C is a graph showing the relationship between the weight percent of copper hydroxide and temperature at a pH of 10.0. As can be seen in FIGS. 8A, 8B, 8C, 9A, 9B, 9C, 10A, 10B and 10C, for a given pH number, the mass of the coating material increases with increasing temperature, while the concentration of copper hydroxide in the coating decreases with increasing temperature. Since the presence of copper hydroxide has a counter-effect on heat transfer performance, higher temperatures will result in better performance due to the decreased concentration of copper hydroxide.

To confirm the feasibility of IAS/aluminum heat transfer devices, aluminum tubes approximately 1 meter in length were constructed. These tubes were charged with various amounts of the IAS according to Example 1. The tubes were constructed of 3003-H2 Alloy aluminum tubing with 6061 alloy end caps sealed by low temperature solder.

Figure 16:
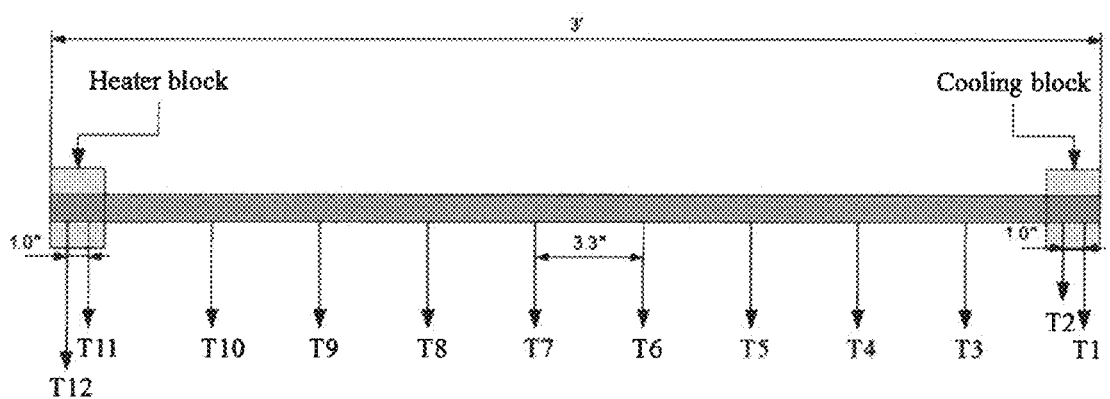
FIG. 16 is a schematic of the test set-up used to evaluate the 3003 and 6061 aluminum alloy heat pipes.

The tubes were laid in a bench top set up and the condenser was inclined approximately 3 degrees above horizontal. 12 thermocouples were arranged on the outer surface of the tube as seen in FIG. 16, which is a schematic of the test set-up. Two 250 W cartridge heaters were embedded in a copper block which encased the base of the tube. The cartridge heaters were connected to a variable voltage controller or variac. The tubes used a copper condenser block, in which there were hollow passageways to allow water flow in and out for a heat exchanger setup.

The tubes were first tested to determine the critical heat flux. This heat flux is determined by the point where the pressure drop required to maintain the evaporation rate defined by the enthalpy of vaporization exceeds the available capillary/gravitational pressure drop, causing a catastrophic dryout in the evaporator. This is evident in the data by a significant rise of the temperatures inside the evaporator. This was done in order to ensure that the critical value was not reached during lifetime testing.

Once the tubes reached dryout, heat flux was cut to the tube and the evaporator temperature was allowed to fall to approximately 60° C. At this point, the heat flux was again supplied, though below the point of dryout.

The tubes were connected to an unregulated power supply, meaning that the power supplied to the tubes varied as the load varied as supplied from a common 208V 20 amp wall socket. This effect is evident when examining the data as the results from the temperature readings tend to vary somewhat over the day. Data was recorded continuously but the tube was actively monitored periodically, in order to determine if an error occurred. A temperature measurement was recorded electronically, approximately every 10 minutes for lifetime testing. The data is the result of lifetime testing conducted over 2 weeks, but the testing continued without evidence of degradation over 7 weeks.

Figure 17:
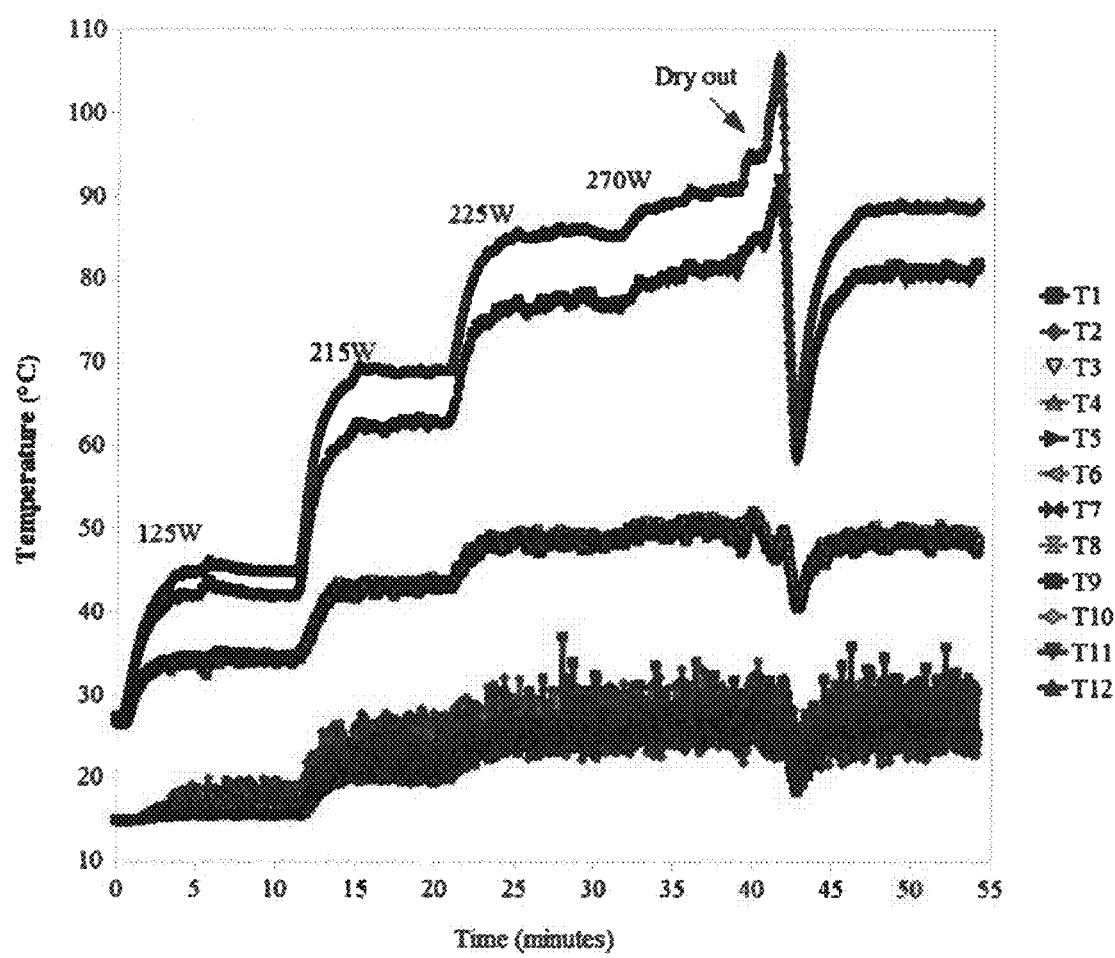
FIG. 17 is a graph depicting the results of the maximum flux testing performed on the 3003 and 6061 aluminum alloy heat pipes.
Figure 18:
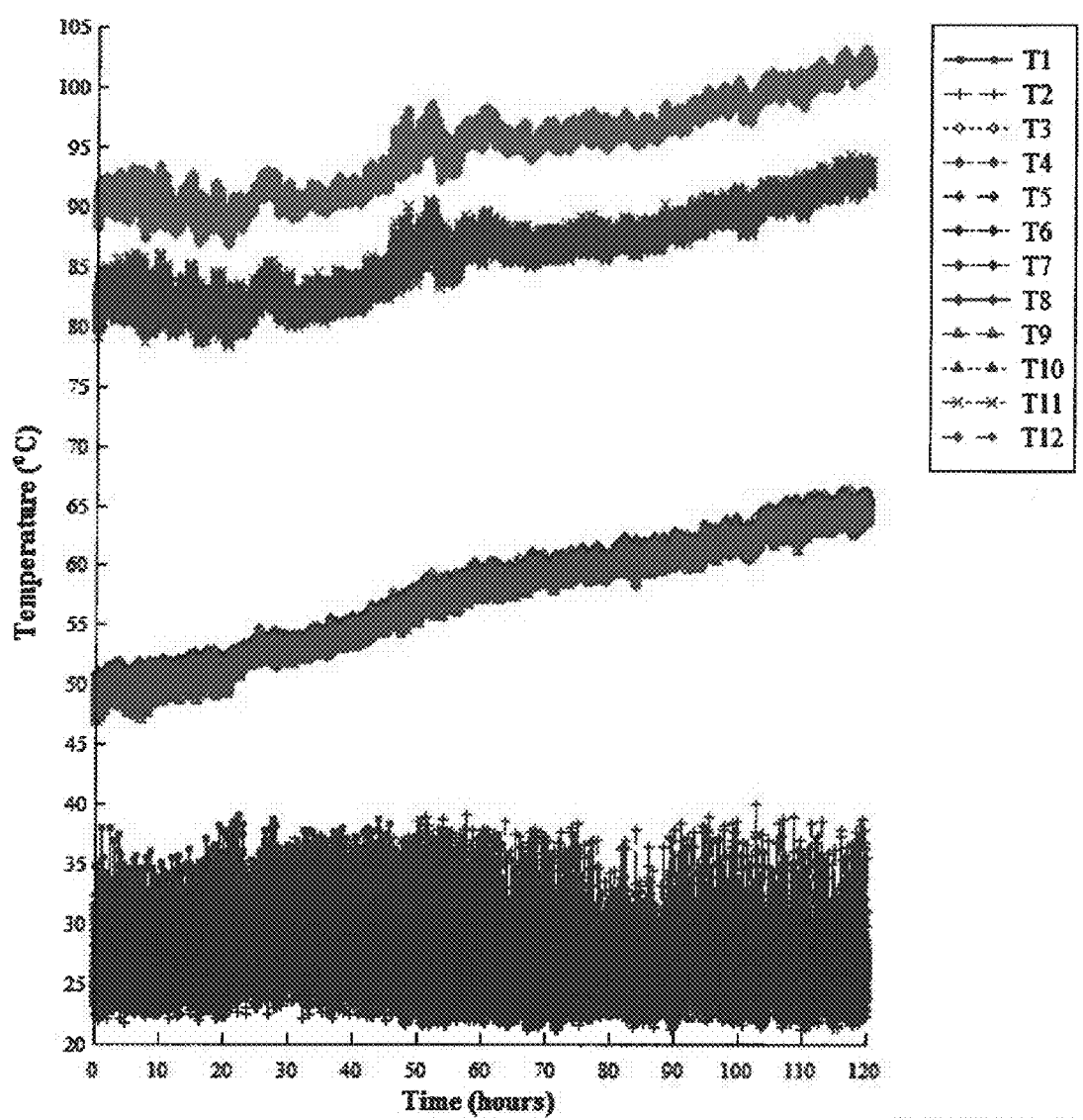
FIG. 18 is a graph depicting the results of the lifetime tests in the first week for the 3003 aluminum alloy heat pipe.
Figure 19:
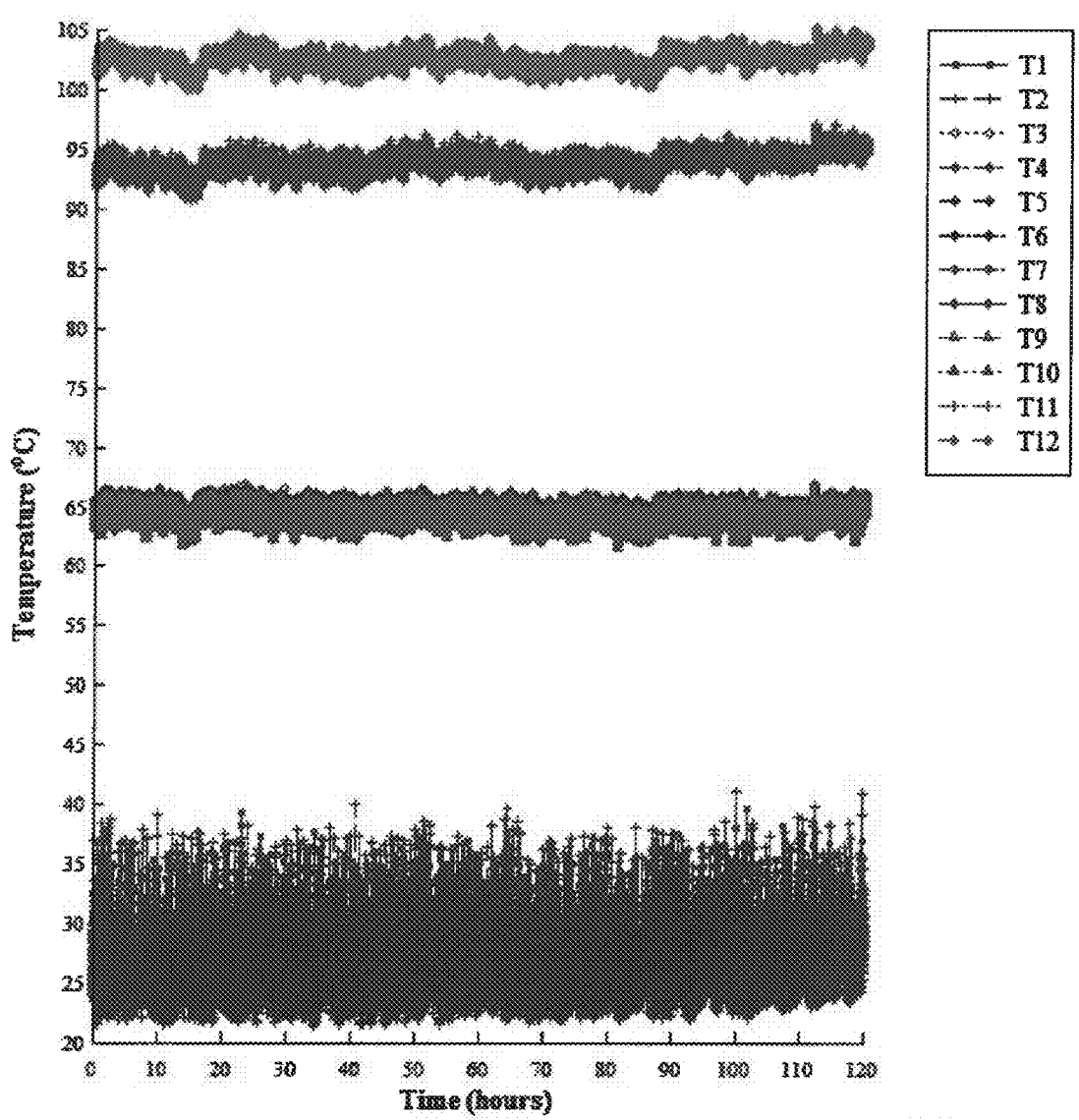
FIG. 19 is a graph depicting the results of the lifetime tests in the second week for the 3003 aluminum alloy heat pipe.

Error! Reference source not found. 17 shows the results of maximum flux testing while FIGS. 18 and 19 show the results of lifetime testing of one of the aluminum tubes. As can be seen in FIG. 17, the dryout point occurred at about 40 minutes as an input heat flux of approximately 280 W was achieved. Because the critical heat flux was 280 W, the experiment was conducted with an input power of 270 W.

FIG. 18 shows the results of testing performed with a solder sealed tube cooled by closed loop circulating water. The individual temperatures show a variation of approximately 10% of the measured value about the mean. Over the course of the week of testing, the temperatures increased by about 10° C. everywhere but the condenser, as the device came to steady state. Calorimetry in the condenser indicated that the heat exchanger initially removed 140 W but rose to about 200 W by the time the experiment reached steady state.

FIG. 19 shows the results from the second week of testing. Again, the variation of the temperature measurements varies approximately 10% around the sample mean. Note that by now, the temperatures remained constant throughout the week, indicating that the tube had reached steady state.

The results show no conventional trend of the temperatures changing over the lifetime of the tube testing, once the tubes reached steady state. This is a strong indication that no formation of non-condensable gas built up in the condenser. This tube continued to run without failure for over 3 months. In both cases, the tubes were sealed with low temperature solder, which prevents heating beyond 150° C.

Figure 20:
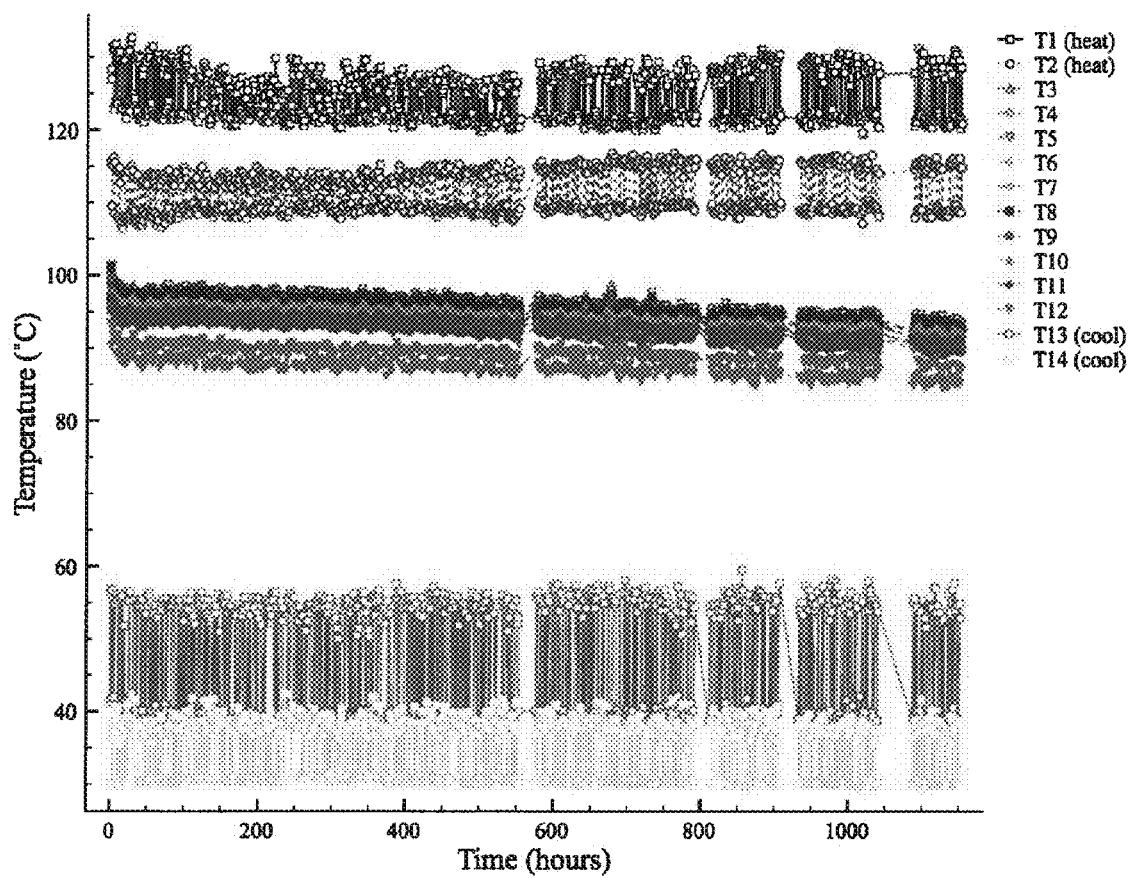
FIG. 20 is a graph depicting the results of the lifetime tests for the 6061 aluminum alloy heat pipe.

FIG. 20 shows the results for the 6061 alloy tube. This tube was also sealed using solder. Similar behavior from the 3003 alloy tube was noted in that there was no sign of non-condensable gas formation. This tube had a slight decline in the adiabatic temperatures over time which was unexpected. This could mean that the insulation around the adiabatic region was breaking down overtime or that some natural convection was taking place within the insulation. It is more likely, however, that the steady decrease in the □T was due to the slow formation of a hydrophilic coating in the interior of the heat pipe. The reactions governing this type of process are known. Since no significant ΔT increase was seen over time in either the evaporator or condenser, and the ΔT across the adiabatic region remained mostly constant, it can still be reasonably assumed that no non-condensable gases formed.

To validate and characterize the above test results for the 3003 and 6061 aluminum alloy tubes, an aluminum thermosiphon lifetime test was also conducted. At the time of filing this application, the thermosiphon had been running for more than 11 weeks without failure. The aluminum thermosiphon lifetime test was run with an evaporator temperature at 120° C. in order to be consistent with the previous testing. The jumps in temperature readings during the initial testing stage were an attempt to find the input heat flux associated with that temperature. It took several days to reach steady temperatures where they no longer increased for a given input power. On August 21st, the input power was increased to 75 w. After three days, the readings stopped increasing in temperature with an evaporator temperature of roughly 120° C. From this point forward, the input power was held constant.

Figure 21:
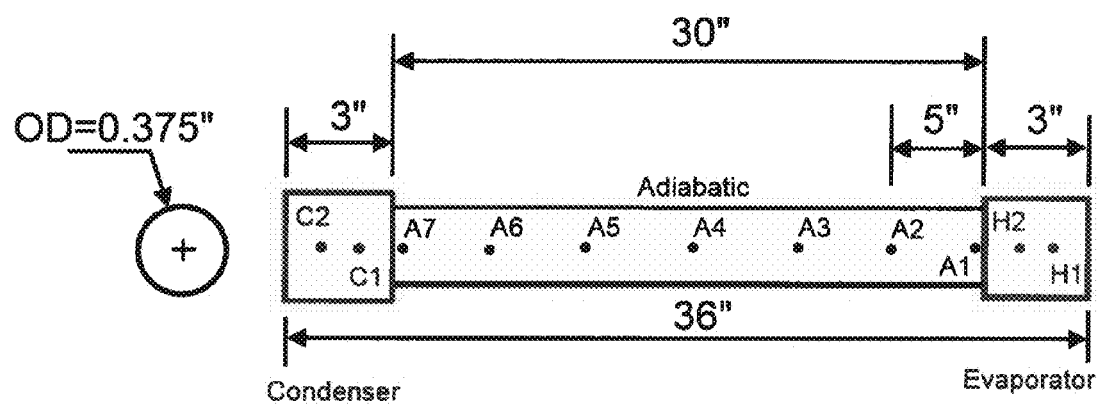
FIG. 21 is a diagram detailing the dimensions of the test setup and instrumentation used for the aluminum thermosiphon experiment.

The condenser section was cooled by passing chilled water at a constant 20° C. from the wall (building supplied water source) through a cooling block. The heater block was a solid copper block surrounding the tube with cartridge heaters inserted. The cartridge heaters were supplied 120V wall power which was regulated by a variac. Input power was obtained by measuring voltage and resistance and performing a Joule heating calculation. FIG. 21 is a diagram detailing the dimensions of the test setup and instrumentation.

The condenser was raised above the heater section to an angle of 5° from horizontal, again, to be consistent with the previous testing. Seven thermocouples were placed along the adiabatic section spaced an equal distance apart at a spacing of 5". This can be seen in FIG. 21. Both the condenser and evaporator lengths were 3" and each was instrumented with two thermocouples on the tube itself, inside the block. The outer diameter of the thermosiphon was 0.375" and it had no wick structure inside (except for the structures produced by the IAS fluid during operation). The entire thermosiphon was 36" in length, leaving the adiabatic section to be 30" long. The entire length of the tube was insulated, including the adiabatic, condenser, and evaporator sections. The ends of the tube were sealed by crimping and soldering shut after vacuuming and charging the pipe with IAS as the working fluid. At the time the experiment began, the tube showed no signs of leaking.

Figure 22:
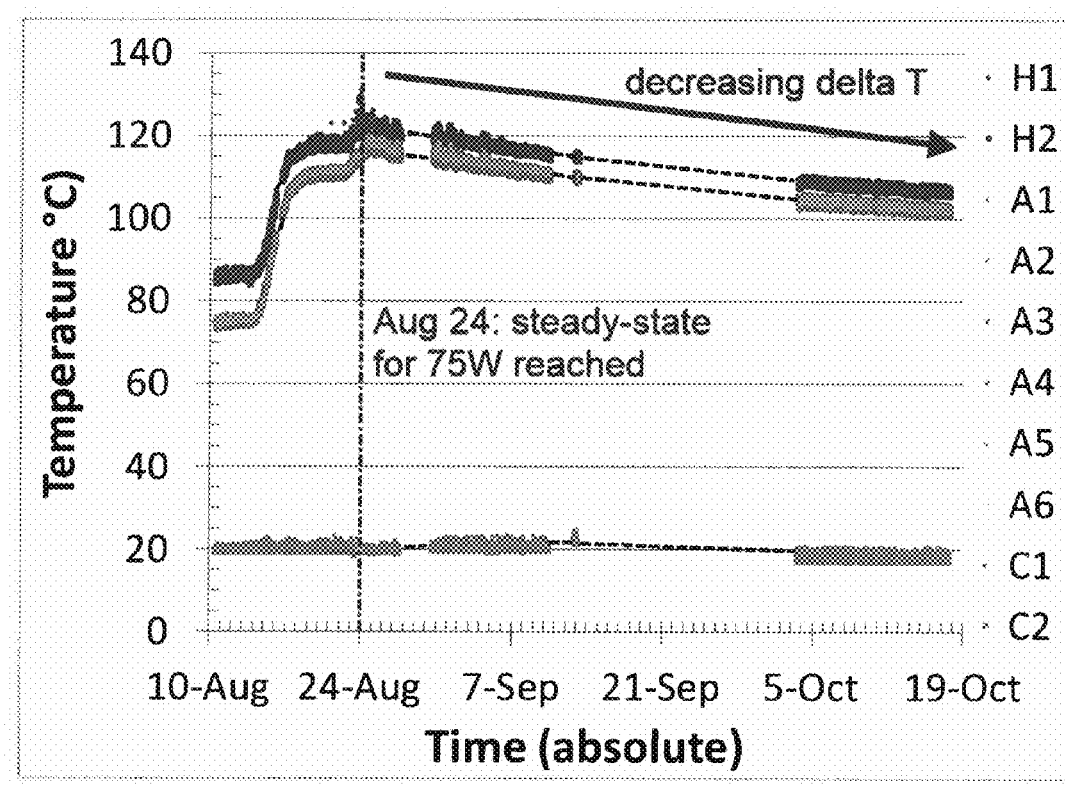
FIG. 22 is a graph depicting the results of the lifetime tests for the aluminum thermosiphon experiment depicted in FIG. 21.

Results of the test can be seen in FIG. 22. The dashed lines represent time periods where data was not recorded (although it was still monitored visually) due to difficulties with the data logging software writing such large amounts of data into memory. The test setup was not interrupted or disturbed at any point, only the recording of data to a file was non-continuous due to software issues. The temperatures during these periods were monitored manually on a daily basis to ensure there were no problems with the experiment. No issues arose and data recording was resumed once the software issues were straightened out.

Figure 23:
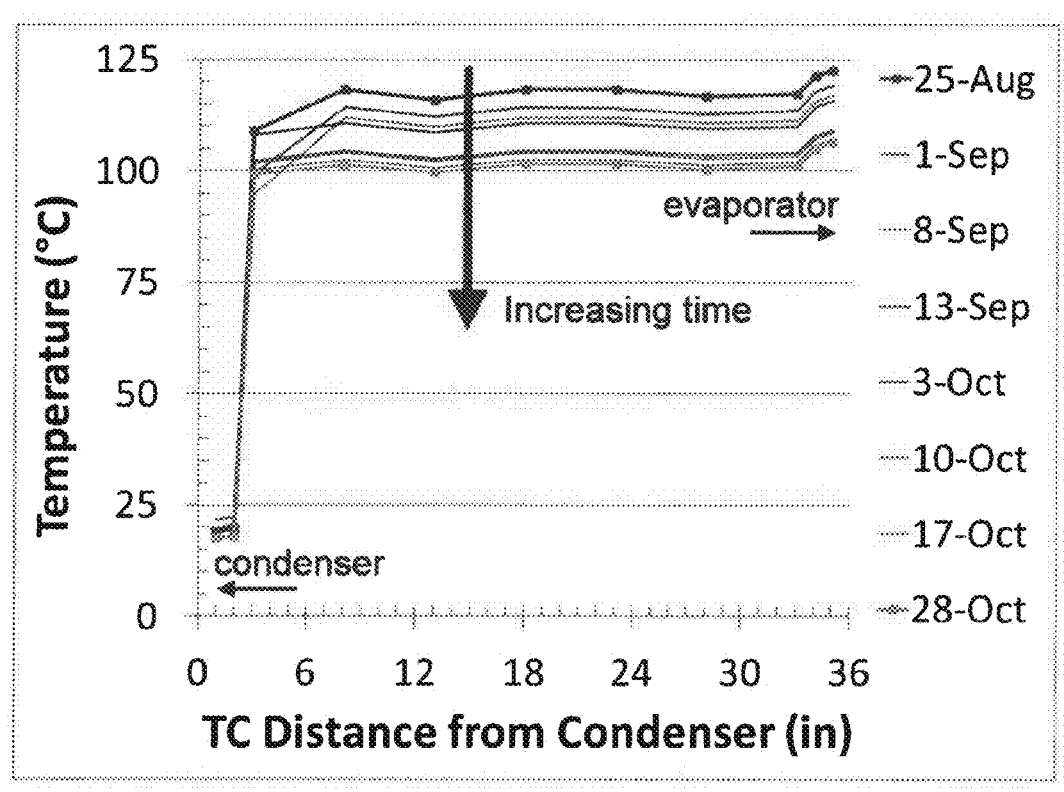
FIG. 23 is an axial temperature plot along the aluminum thermosiphon tested in the setup depicted in FIG. 21.

At the time of filing this application, the lifetime test had been in operation for over nine weeks and will continue to run. Note that a similar trend of decreasing □T's over time is observed in the 5052 case as in the 6061. Again, this is likely attributed to the slow formation of a hydrophilic coating. An axial temperature plot along the thermosiphon can be seen in FIG. 23. Also, the improvement in superheat over time is evident in this graph as well. The condenser temperature remained the same while the adiabatic and heater temperatures decreased as time went on.

While small variations in the power from the wall as well as the temperature and flow rate of chilled wall water are unavoidable, these variations are small and irregular. They do not explain the steady decrease in temperature difference seen over the course of this experiment. It is believed that this phenomenon is the slow growth of a hydrophilic layer in the evaporator due to chemical reactions between the aluminum surface and IAS. Unlike when IAS is used in copper tubes, the reaction responsible for the hydrophilic layer on top of the passivating layer happens very slowly and is centered on the silver ion "seeds" seen in FIG. 12. It is from there that the hydrophilic layer slowly grows outward, thereby improving performance as a greater percentage of the evaporator area is covered with this coating.

While the superheat of the thermosiphon has been shown to improve over time for this experiment, the magnitude of the superheat itself is rather large. This leads one to believe there could be blockage in the condenser section or some other resistance causing the large temperature jump between the adiabatic thermocouple closest to the condenser and the condenser temperatures themselves. In an effort to explore this issue, various tests and checks were performed on the test setup. First, the insulation on the adiabatic region was removed and the thermocouples were checked to see that they were attached properly; everything was normal. Next, a separate thermocouple probe was used to double check the readings each attached thermocouple gave. It was found that they were all reasonably accurate. The probe was then used to check temperatures between the instrumented thermocouples, especially the small area on the tube leading to the condenser block. These temperatures did not show much of a gradient trending from adiabatic to condenser temperatures.

At this point in the investigation, it was assumed that there was likely a small amount of NCG responsible for this large resistance in the condenser. Since this hypothetical NCG did not lead to a cascading failure, it is likely a result of improper charging and/or sealing techniques during thermosiphon preparation. It is also possible that a small amount of gas was released during the soldering process, but it is finite in nature as no new gas was formed after sealing. If the NCG was a result of unwanted reactions between the aluminum tube and the IAS, there would have been a runaway production of hydrogen gas produced, leading to a failure in a short period of time.

In order to fully characterize whether or not NCG was being produced in the tube, a quick test of hysteresis of the condenser side thermocouples was tested. If there were significant NCG present in the condenser end, then increasing the power input would have increased temperatures along the tube, thus increasing internal pressure. This would have compressed any NCG in the condenser end and would have manifested itself in temperature readings. Once the NCG slug compresses beyond the first condenser thermocouple, it should start reading temperatures more in line with the adiabatic region and not the condenser, as a result of simply shifting the axial location of the NCG resistance. It should be noted that the only temperatures that appeared low were inside the condenser itself. As such, if there was NCG present in the tube it would not have extended outside of that region due to the much higher temperature readings immediately outside of the condenser.

Input power was increased incrementally to 155 W from 75 W. The temperatures observed in the condenser did not change significantly as would be expected with NCG. While the temperatures of the tube increased uniformly on all thermocouples with the increased power, the results indicated that the tube was still functioning as a thermosiphon.

It is also worth mentioning that the tube was a thermosiphon operating at near horizontal conditions which is not appropriate for assessing the performance of the tube. In this orientation, the liquid film was most likely not in contact with the tube in the locations where the thermocouples were present, as the thermocouples measured the exterior temperature of the tube on the midline. In this orientation, the liquid film would be present on the bottom of the tube and the thermocouples would most likely read a temperature that is almost the temperature of the condenser block. The horizontal orientation of the thermosiphons was chosen out of legacy and a desire to be consistent with previous tests.

Based on these results, it is believed that there is a small amount of NCG present from the initial charging and sealing procedure. This could be the result of the fluid not being degassed properly, incorrect vacuum procedures, or other circumstances. However, it can again be reasonably assumed that NCG generation during testing did not occur as this would have quickly led to a failure.

The IAS according to embodiments of the present invention allows water (which has advantageous thermal properties) to be used as part of the working fluid in heat transfer devices made of aluminum or an aluminum alloy. This leads to lower cost, lighter weight heat transfer devices that exhibit better heat transfer performance. Of particular note are applications in electronic equipment thermal management where, in the past, only expensive copper solutions were available. Additionally, the use of heat transfer devices with an IAS working fluid as a means for regeneration in electrical power plants using steel thermosiphons is a meaningful way to enhance efficiency of the power plant. The buckling of aluminum aircraft carrier decks due to temperature gradients can be dealt with using the IAS according to embodiments of the present invention as a heat transfer medium to even out the gradients. In addition, aluminum heat pipes charged with IAS can be used in thermal management applications in space where weight savings are paramount.

While certain embodiments of the present invention have been illustrated and described, those of ordinary skill in the art will understand that various modifications and changes can be made to the described embodiments without departing from the spirit and scope of the present invention, as defined in the following claims.

What is claimed is:

1. An inorganic aqueous solution for use in a phase-change heat transfer device, the inorganic aqueous solution comprising:
   a strong oxidizer ion;
   a passivation component;
   a coating ion;
   an electron balancing component; and
   water.

2. The inorganic aqueous solution of claim 1, wherein the strong oxidizer ion is a permanganate ion or a chromate ion.

3. The inorganic aqueous solution of claim 1, wherein the passivation component is a silver ion, a gold ion or a platinum ion.

4. The inorganic aqueous solution of claim 1, wherein the passivation component is a silver ion.

5. The inorganic aqueous solution of claim 1, wherein the electron balancing component comprises hydroxide ions.

6. The inorganic aqueous solution of claim 1, wherein the coating ion is selected from the group consisting of calcium ions, magnesium ions, sodium ions, strontium ions, and mixtures thereof.

7. An inorganic aqueous solution for use in a phase-change heat transfer device, the inorganic aqueous solution comprising:
   potassium permanganate ($KMnO_4$);
   potassium dichromate ($K_2Cr_2O_7$);
   chromium trioxide ($CrO_3$);
   silver chromate ($Ag_2CrO_4$);
   strontium hydroxide ($Sr(OH)_2$);
   calcium hydroxide ($Ca(OH)_2$);
   magnesium hydroxide ($Mg(OH)_2$);
   sodium hydroxide (NaOH); and
   water.

8. The inorganic aqueous solution of claim 7, further comprising boric acid ($H_3BO_3$).

9. The inorganic aqueous solution of claim 7, further comprising an alcohol.

10. The inorganic aqueous solution of claim 9, wherein the alcohol is methanol.

11. The inorganic aqueous solution of claim 7, wherein the inorganic aqueous solution has an initial pH of about 5 to about 7.

12. A heat transfer device comprising:
   an elongated member having a cavity and comprising a conductive material; and
   the inorganic aqueous solution of claim 1 in the cavity of the elongated member.

13. The heat transfer device of claim 12, wherein the conductive material comprises a material selected from the group consisting of aluminum, aluminum alloys, copper, copper alloys, stainless steel, and combinations thereof.

14. The heat transfer device of claim 12, wherein the conductive material comprises aluminum and/or an aluminum alloy.

15. The heat transfer device of claim 13, further comprising a wick lining the cavity of the elongated member.

16. The heat transfer device of claim 15, wherein the wick comprises a material selected from the group consisting of aluminum, aluminum alloys, copper, copper alloys, stainless steel, and combinations thereof.

17. The heat transfer device of claim 15, wherein the wick comprises copper or a copper alloy.

18. The heat transfer device of claim 15, wherein the wick is a bi-porous wick.

19. The heat transfer device according to claim 12, further comprising a passivation layer lining the cavity, the passivation layer being formed from a reaction between the inorganic aqueous solution and the conductive material.

20. The heat transfer device of claim 15, further comprising a passivation layer on the wick, the passivation layer being formed from a reaction between the inorganic aqueous solution and a material of the wick.

21. A method for preparing an inorganic aqueous solution for use in a phase-change heat transfer device, the method comprising:

dissolving potassium permanganate in water to form a solution;

dissolving potassium dichromate in the solution;

adding chromium trioxide to the solution;

adding silver chromate to the solution;

adding at least one of sodium hydroxide, strontium hydroxide, calcium hydroxide, or magnesium hydroxide to the solution; and diluting the solution.

22. The method according to claim 21, further comprising: adjusting the pH of the solution.

23. The method according to claim 22, wherein the adjusting the pH comprises adding boric acid, additional chromium trioxide, and/or additional sodium hydroxide to the solution.

24. The method according to claim 22, wherein the adjusting the pH comprises adjusting the pH to about 5 to about 7.

25. The method according to claim 22, wherein the adjusting the pH comprises adjusting the pH to about 6.22.

26. The method according to claim 21, wherein the diluting the solution comprises adding water and/or an alcohol to the solution.

27. The method according to claim 26, wherein the alcohol comprises methanol.

\* \* \* \* \*